United States Patent [19]

Wilder, Jr.

[11] 4,438,490
[45] Mar. 20, 1984

[54] CLOCK CONTROL OF A CENTRAL PROCESSING UNIT FROM A MONITOR INTERFACE UNIT

[75] Inventor: Richard P. Wilder, Jr., North Billerica, Mass.

[73] Assignee: Honeywell Information Systems Inc., Waltham, Mass.

[21] Appl. No.: 307,564

[22] Filed: Oct. 1, 1981

[51] Int. Cl.³ .......................... G06F 11/30; G06F 1/04
[52] U.S. Cl. ........................................................ 364/200
[58] Field of Search ................................ 364/200, 900

[56] References Cited

U.S. PATENT DOCUMENTS

| | | | |
|---|---|---|---|
| 3,717,851 | 2/1973 | Cocke et al. | 364/200 |
| 4,000,485 | 12/1976 | Barlow et al. | 364/200 |
| 4,030,075 | 6/1977 | Barlow | 364/200 |
| 4,040,021 | 8/1977 | Birchall et al. | 364/200 |
| 4,053,944 | 10/1977 | Dixon | 364/200 |
| 4,143,418 | 3/1979 | Hodge et al. | 364/200 |

*Primary Examiner*—Eddie P. Chan
*Attorney, Agent, or Firm*—George Grayson; Nicholas Prasinos

[57] ABSTRACT

A monitor interface unit couples a monitor to a data processing system which includes a central processing unit (CPU). The monitor generates data for determining the performance of the data processing unit. The monitor interface unit includes apparatus for stopping the CPU clock during a particular CPU operation and then slowing down the CPU clock rate.

6 Claims, 22 Drawing Figures

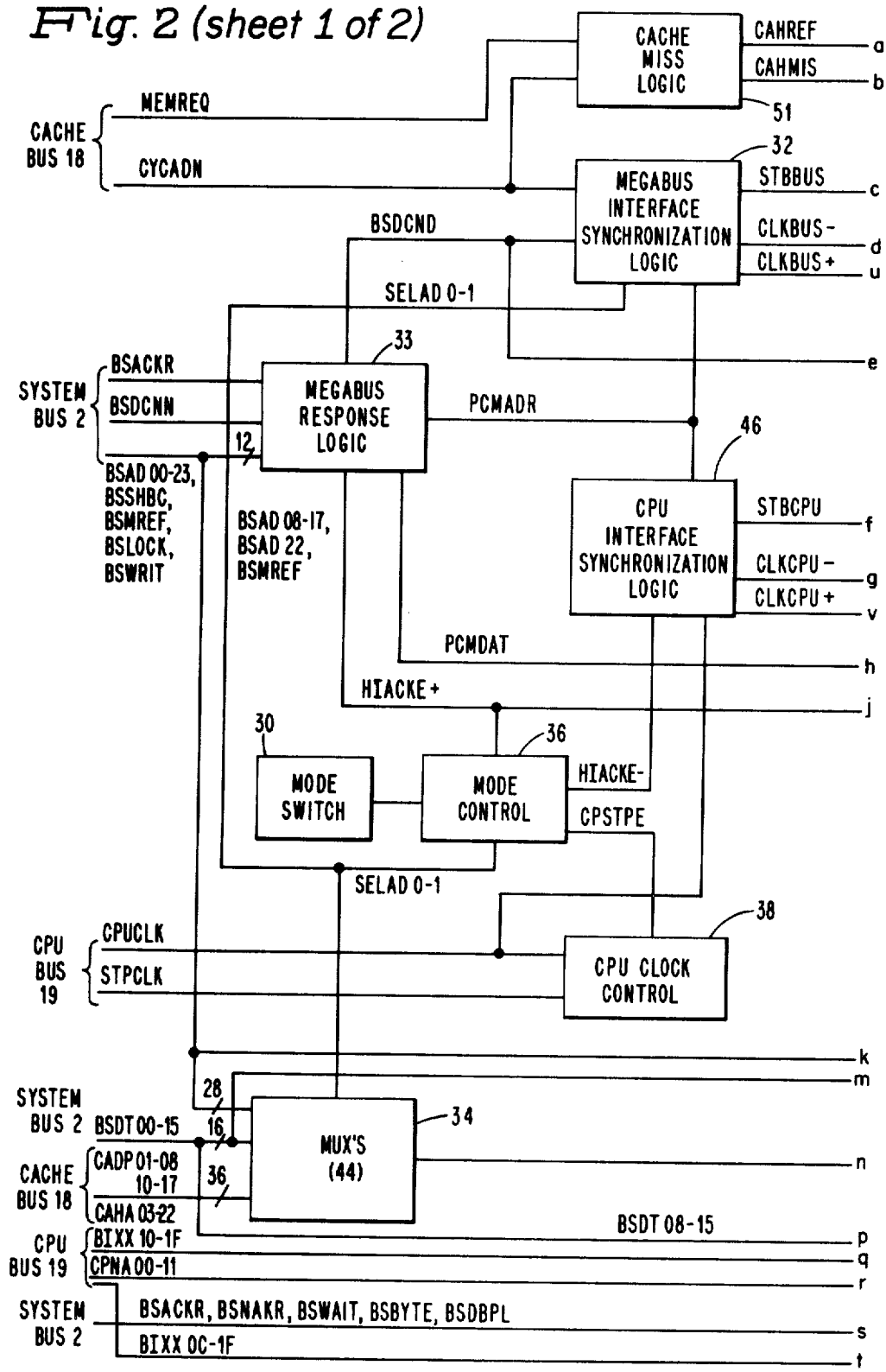

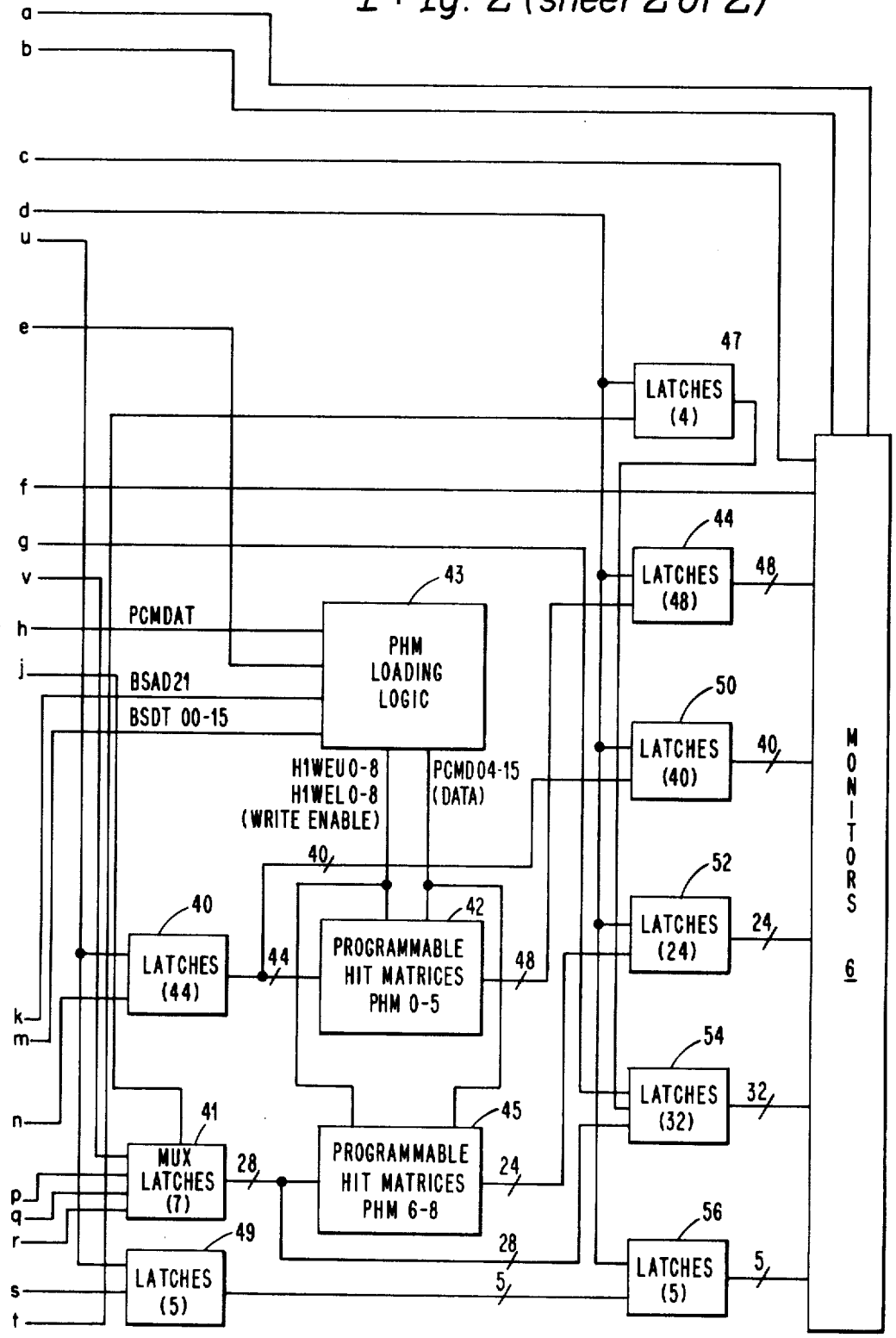
Fig. 2 (sheet 2 of 2)

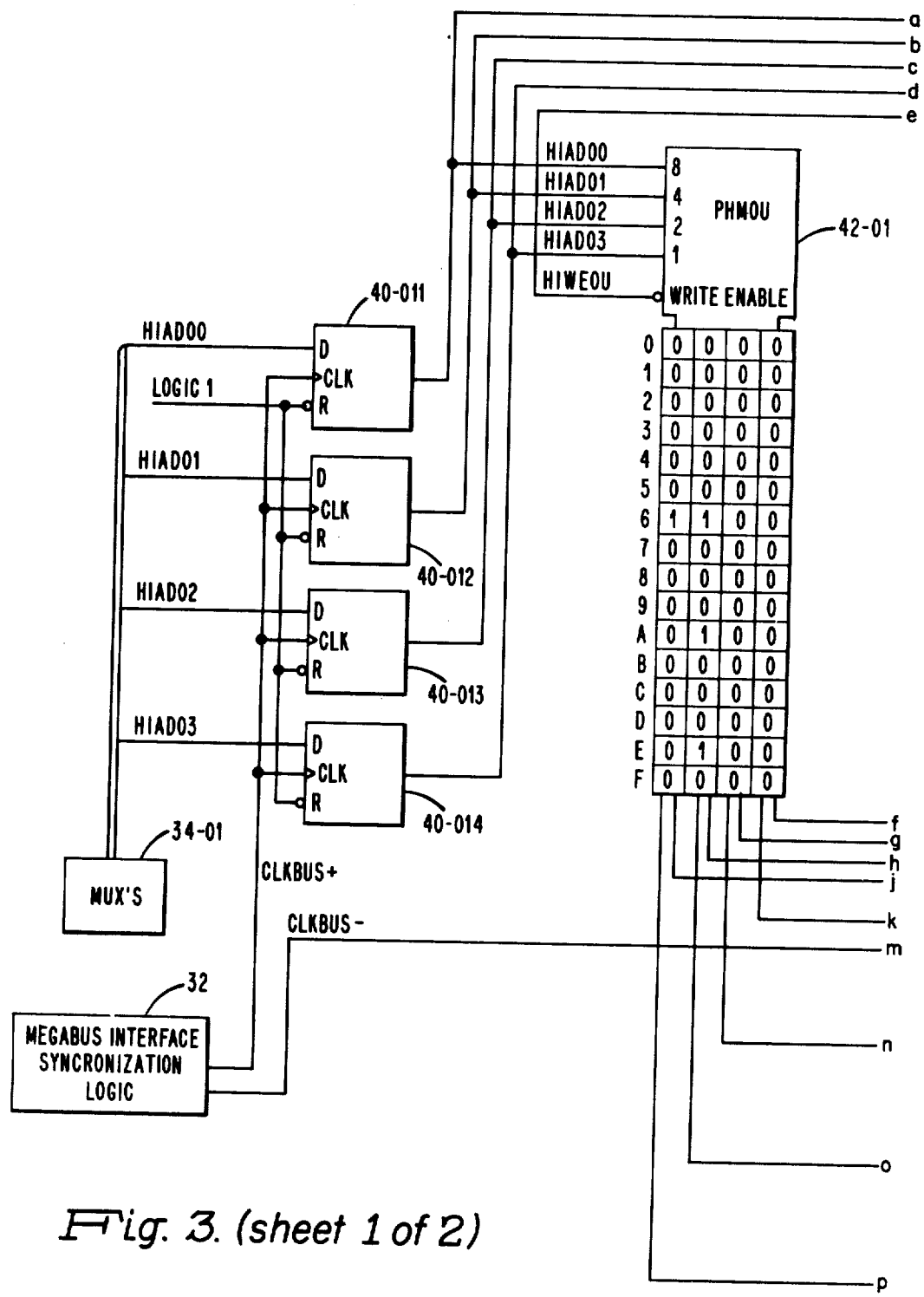
Fig. 3. (sheet 1 of 2)

| OPERATION | ADDRESS BUS 23 | DATA BUS 25 |
|---|---|---|
| (a) MEMORY WRITE | [0–2,3–22,23] MEMORY ADDRESS | [0–15] DATA |
| (b) MEMORY READ REQUEST | [0–2,3–22,23] MEMORY ADDRESS | [0–9, 10–15] CHANNEL NUMBER OF SOURCE |
| (c) MEMORY READ RESPONSE | [0–23] | [0–15] DATA |
| (d) I/O OUTPUT COMMAND | [0–8] CHANNEL NUMBER OF DESTINATION [17,18–23] FUNCTION CODE | [0–15] DATA |
| (e) I/O INPUT COMMAND | [0–8] CHANNEL NUMBER OF DESTINATION [17,18–23] FUNCTION CODE | [0–9, 10–15] CHANNEL NUMBER OF SOURCE |
| (f) I/O INPUT RESPONSE | [0–8, 17,18–23] CHANNEL NUMBER OF DESTINATION | [0–15] DATA |
| (g) IOLD OUTPUT COMMAND | [0–7] MODULE NUMBER / [8, 17,18–23] CHANNEL NUMBER OF DESTINATION FUNCTION CODE | [0–15] ADDRESS |
| (h) | [0–8, 17,18–23] CHANNEL NUMBER OF DESTINATION FUNCTION CODE | [0, S, 1–15] RANGE |
| (i) CP ACTION REQUEST | [0–8, 17,18–23] CHANNEL NUMBER OF DESTINATION ACTION CODE | [0–15] DATA |
| (j) INTERRUPT | [0–8, 17,18–23] CHANNEL NUMBER OF DESTINATION | [0–9, 10–15] CHANNEL NUMBER OF SOURCE / LEVEL NUMBER OF SOURCE |

Fig. 5a–j.

| BUS CONTROL LINE | | | | TYPE OF BUS TRANSFER | FORMAT OF BUS INFORMATION (FIGURE) |
|---|---|---|---|---|---|
| BSMREF | BSLOCK | BSWRIT | BSSHBC | | |
| 0 | 0 | 0 | 0 | I/O INPUT REQUEST | 5e |
| 0 | 0 | 0 | 1 | I/O INPUT RESPONSE OR MEMORY READ RESPONSE | 5f, 5c |
| 0 | 0 | 1 | 0 | I/O OUTPUT OR INTERRUPT | 5d, 5j, 5g, 5h |
| 0 | 0 | 1 | 1 | ILLEGAL | |
| 1 | 0 | 0 | 0 | MEMORY READ REQUEST | 5b |
| 1 | 0 | 0 | 1 | ILLEGAL | |
| 1 | 0 | 1 | 0 | MEMORY WRITE | 5a |
| 1 | 0 | 1 | 1 | ILLEGAL | |
| 1 | 1 | 0 | 0 | MEMORY READ REQUEST, TEST & SET LOCK | 5b |
| 1 | 1 | 0 | 1 | MEMORY READ REQUEST, RESET LOCK | 5b |
| 1 | 1 | 1 | 0 | MEMORY WRITE, TEST & SET LOCK | 5a |
| 1 | 1 | 1 | 1 | MEMORY WRITE, RESET LOCK | 5a |

*Fig. 6.*

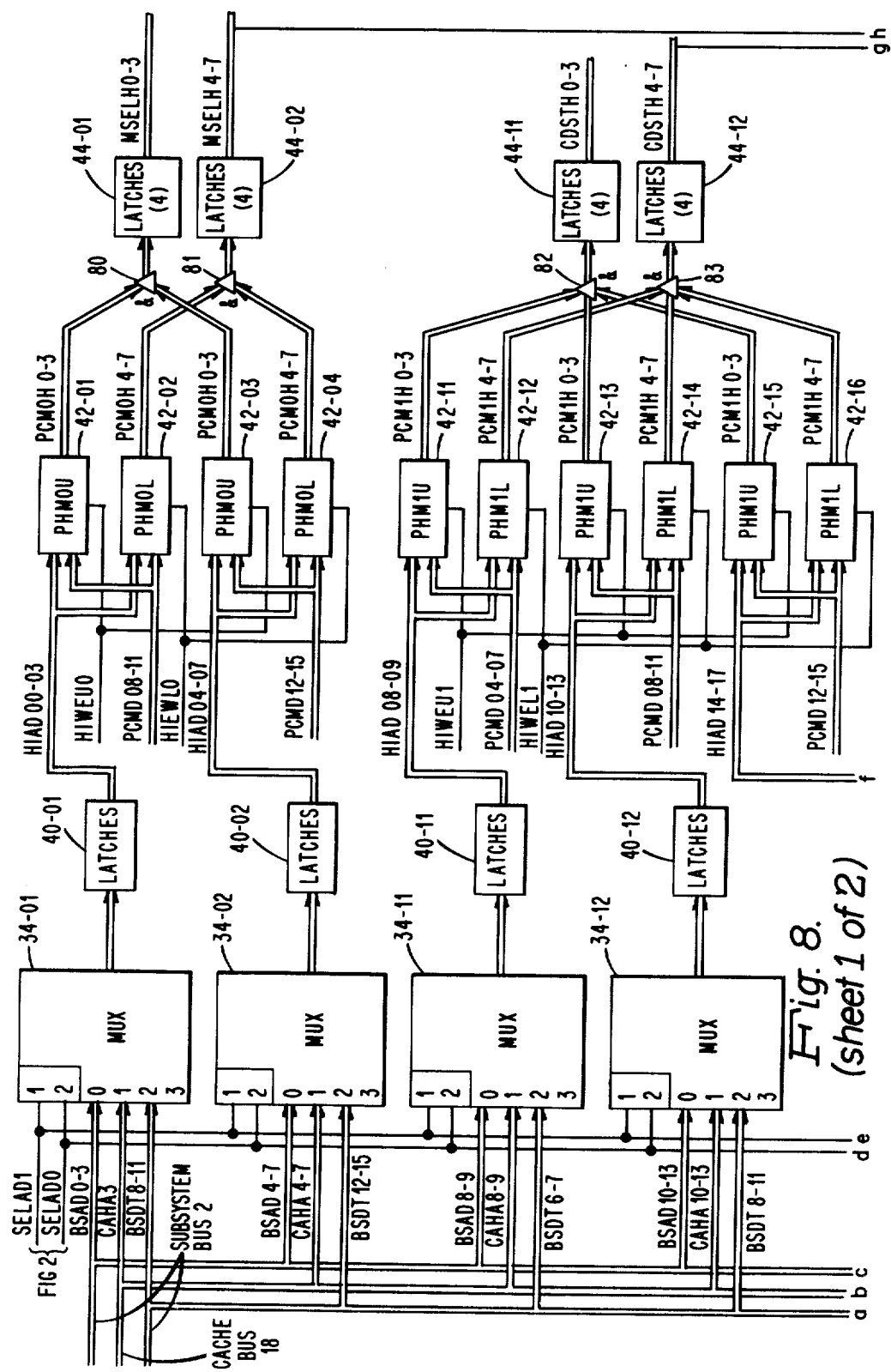
Fig. 8. (sheet 1 of 2)

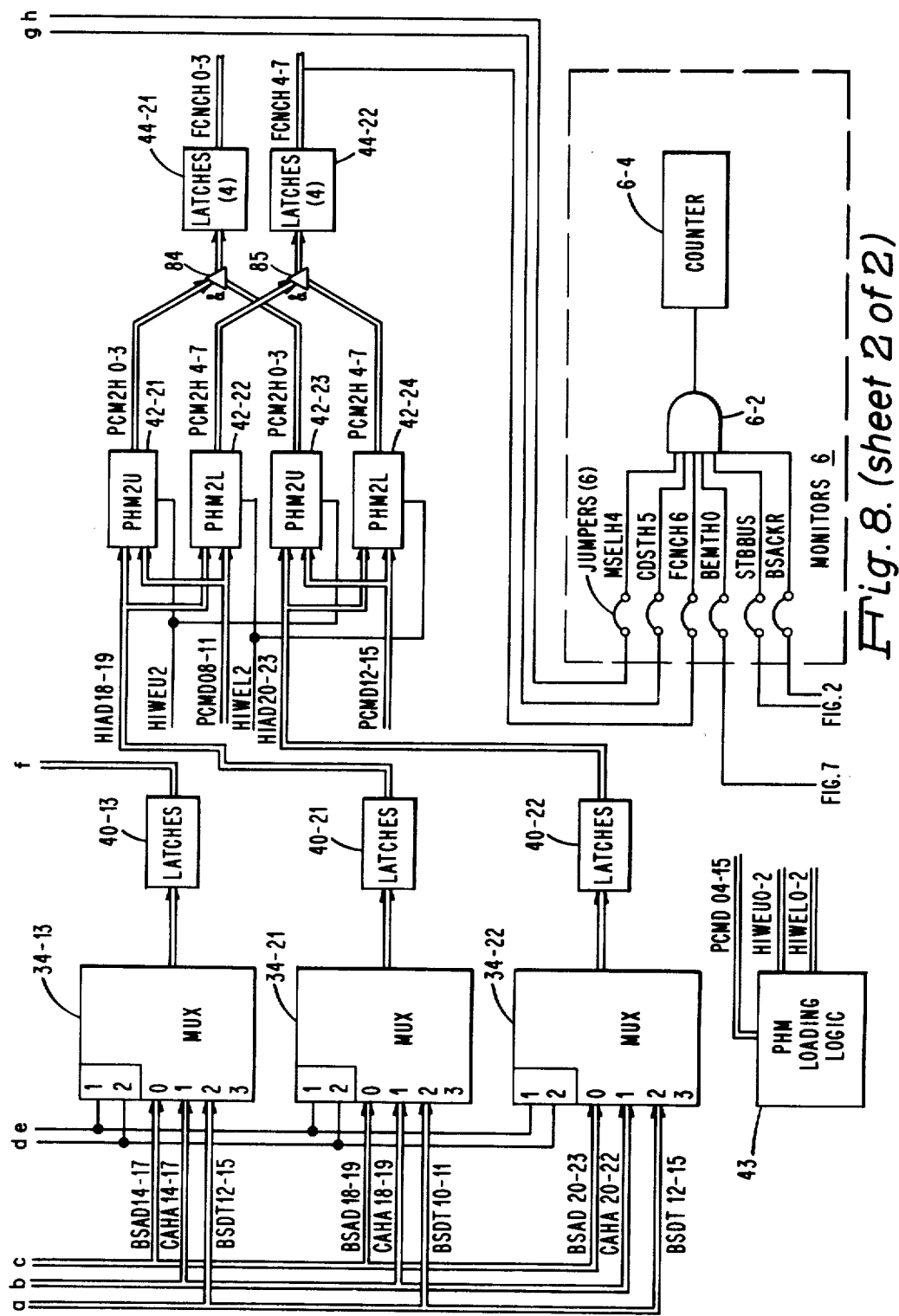
Fig. 8. (sheet 2 of 2)

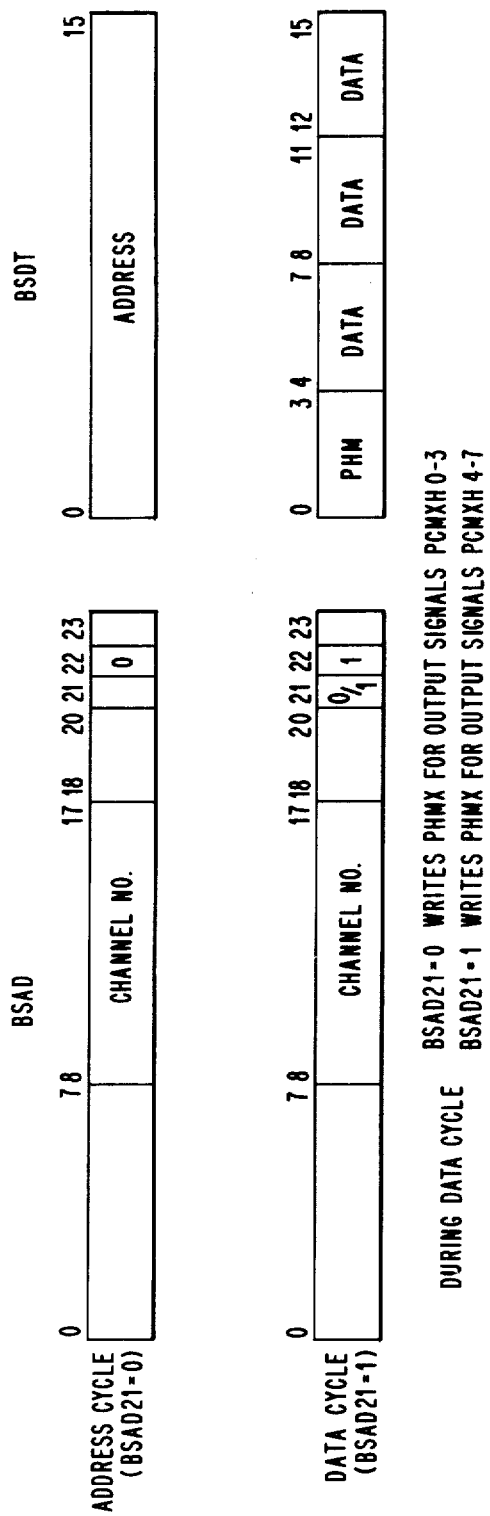

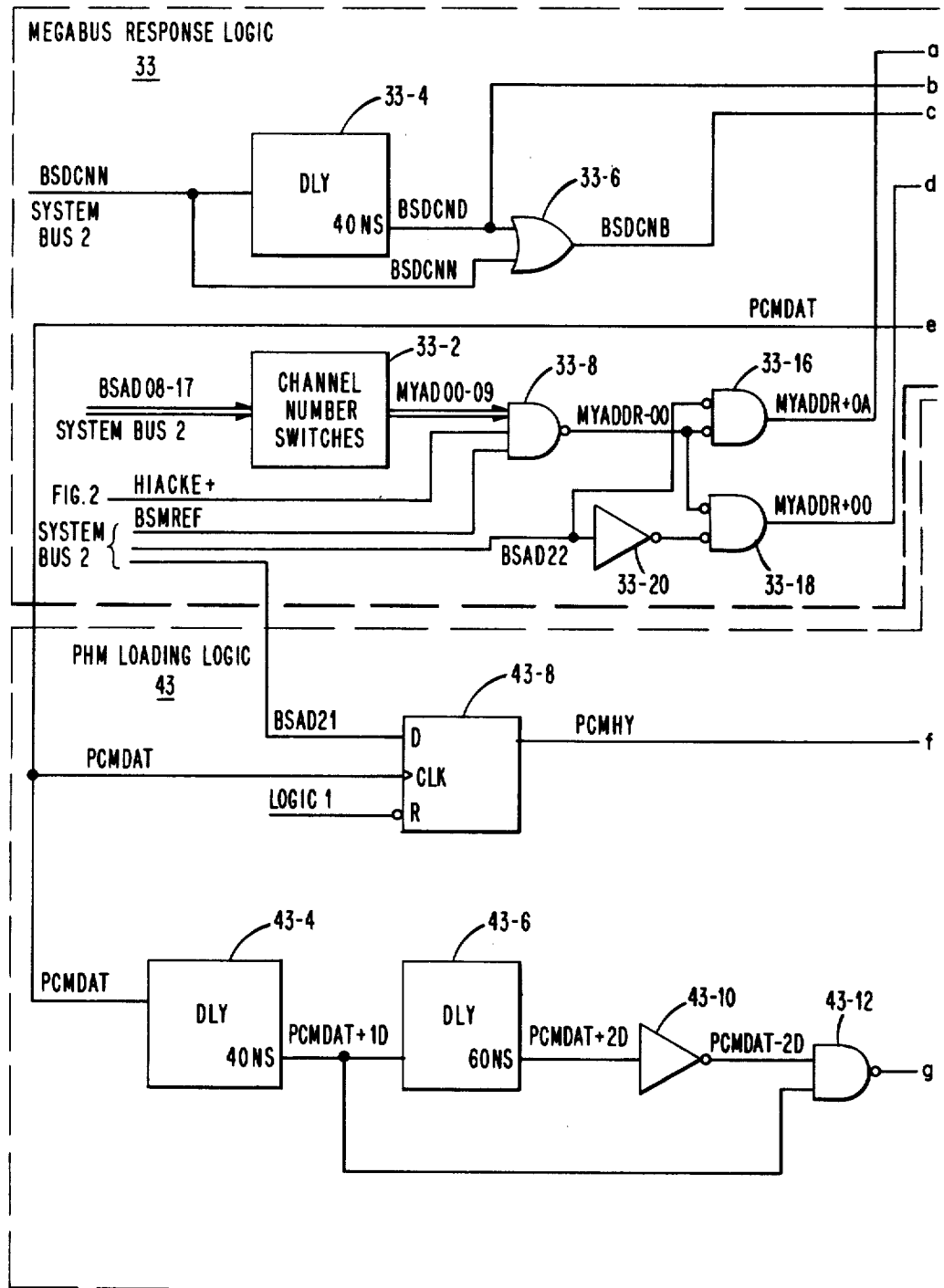
Fig. 10. (sheet 1 of 2)

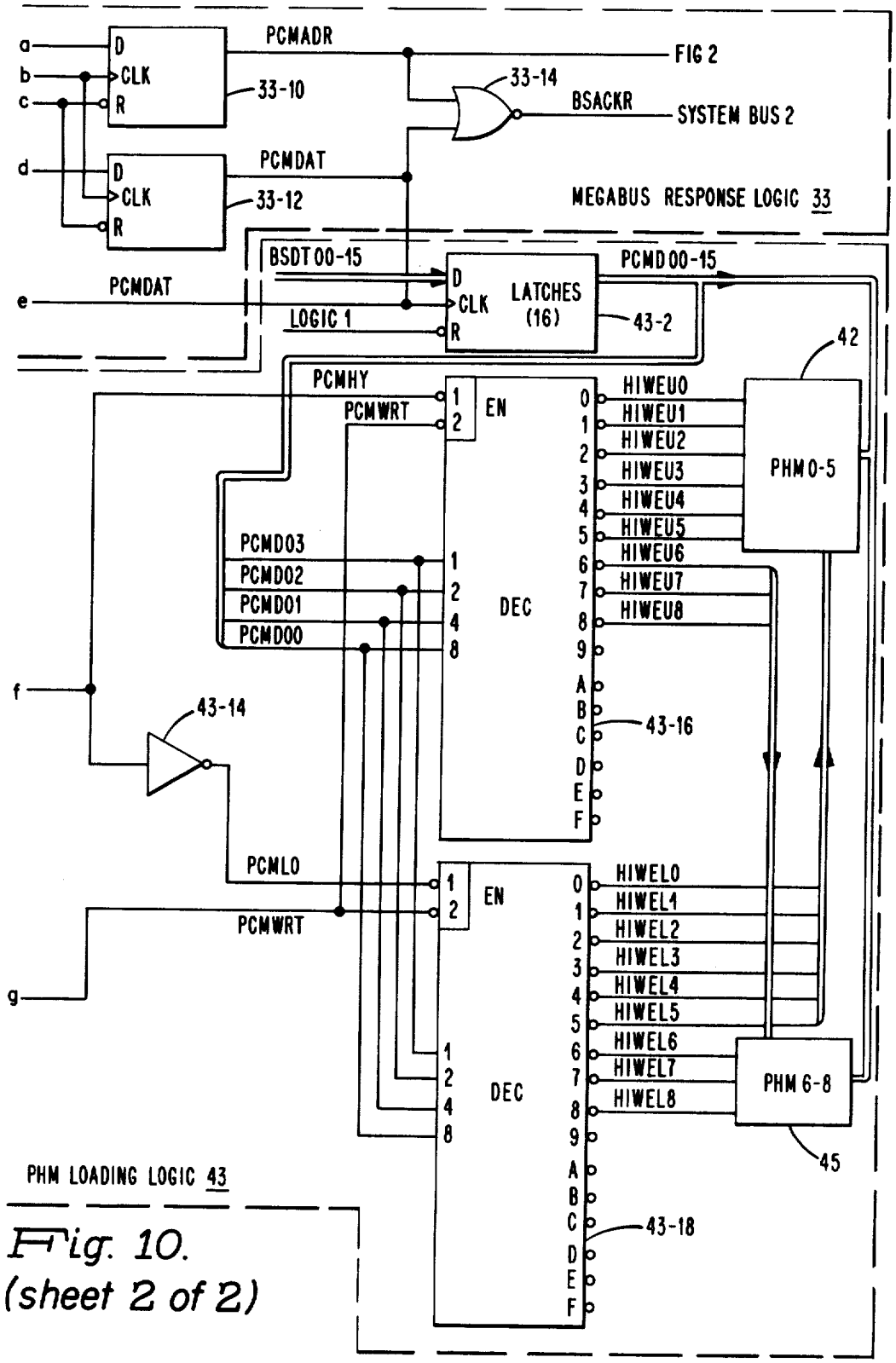
Fig. 10. (sheet 2 of 2)

CLOCK CONTROL OF A CENTRAL PROCESSING UNIT FROM A MONITOR INTERFACE UNIT

RELATED APPLICATIONS

The following U.S. patent applications filed on an even date with the instant application and assigned to the same assignee as the instant application are related to the instant application and are incorporated herein by reference.

1. "Programmable Hit Matrices Used in a Hardware Monitoring Interface Unit" by Richard P. Wilder, Jr., having U.S. Ser. No. 307,566 and filed on Oct. 1, 1981.

2. "Apparatus for Loading Programmable Hit Matrices Used in a Hardware Monitoring Interface Unit" by Richard P. Wilder, Jr., having U.S. Ser. No. 307,569 and filed on Oct. 1, 1981.

3. "Clocking System for a Computer Performance Monitoring Device" by Richard P. Wilder, Jr., having U.S. Ser. No. 307,565 and filed on Oct. 1, 1981.

BACKGROUND OF THE INVENTION

1. Field of the Invention

The invention relates generally to the monitoring of activity of a data processing system and more specifically to the generation of a signal from the monitoring unit to slow up or to stop the clock of a central processing unit.

2. Description of the Prior Art

The throughput of prior art data processing systems was measured by writing software routines and measuring the time it took for the system to execute the routines. When new systems were designed, the same software routines were executed on the new and the old systems and the difference in running time noted. Central processor unit (CPU) limited and peripheral limited software routines were used to compare the throughput of the old and new systems. The execution time of a particular instruction was determined with an oscilloscope. A typical data processing system is described in the "Level 6 Minicomputer Systems Handbook", Order No. CC71, published by Honeywell Information Systems Inc., Waltham, Mass. 02154, copyright Oct. 1978.

Monitoring devices were developed having counters and magnetic tape drives. Typical of these devices is the NCR Comten Model 7916. A typical monitoring device is described in "Dynaprobe 8028 Users Guide", Order No. MP 8028, published by NCR Comten, 1950 W. County Road, St. Paul, Minn., 58113, copyright Nov. 1977. Probes coupled to the monitoring device are placed on the backboard pins of the system being monitored. The signals received by the monitoring device are wired to logic elements such as AND gates, OR gates, inverters and counters to develop performance data. These monitoring devices present a number of problems. Often many signals, each requiring a probe, are needed for the analysis. The pins on the system being monitored are difficult to locate, and the probes easily fall off. The prior art has the requirement of providing probe points for certain signals which increase the system cost.

It is also desirable for customer personnel to take performance measurements, particularly when the customers write their own software. Here the customer must rely on maintenance personnel to determine which backboard signals are needed and to place the probes on the proper backboard pins.

When monitoring the activity of the central processing unit, there is a requirement for slowing down the central processing unit (CPU) in order to monitor a sequence of events or to stop the central processing unit. For example, a trace of all CPU instructions executed and/or a trace of all CPU instruction addresses may be desired. Since present-day monitors are incapable of keeping pace with present-day CPU's, a requirement for slowing down the CPU is now established. There may also be a need to stop the CPU at a particular system event and step slowly through the subsequent cycles. Some of these stop conditions may not be possible to do by software or firmware. These are difficult for maintenance personnel to do from the CPU backplane and relatively impossible for the customer operator to do.

OBJECTS OF THE INVENTION

It is an object of the invention to have an improved data processing system monitor.

It is another object of the invention to have a monitoring system that may easily and readily be used by customer personnel.

It is also another object of the invention to provide apparatus for slowing down the CPU clock.

It is still another object of the invention to provide apparatus for stopping the CPU clock.

SUMMARY OF THE INVENTION

A data processing system includes a number of subsystems, a main memory, a central processor unit (CPU), a cache memory and a number of peripheral controllers, all coupled in common to a system bus. The CPU is also directly coupled to cache. Information is transferred between subsystems via the system bus as well as between the CPU and cache.

A hardware monitoring interface unit (HMIU) is also coupled to the system bus as well as the CPU and cache for monitoring this information flow and sending hit signals indicative of predetermined events to a monitor for generating performance data. The HMIU includes a mode switch for generating a CPSTPE signal for conditioning the CPU clock control logic to generate a STPCLK signal to slow down the CPU clock rate.

A first one-shot multivibrator is conditioned by the CPSTPE signal to generate an ENBSTP signal when receiving a first CPU clock signal. The length of the ENBSTP signal depends on the setting of a 50K ohm potentiometer. The fall of the CPU clock signal sets a first latch which is conditioned by the ENBSTP signal to set and generate the STPCLK signal. The CPU is responsive to the STPCLK signal to stall the CPU clock.

A second one-shot multivibrator is responsive to the ENBSTP signal to generate an RVYSTP signal. Note, the purpose of this one-shot multivibrator is to allow the appropriate recovery time for the first one-shot to operate properly. A second latch is set on the fall of the RVYSTP signal to reset the first latch. The STPCLK signal is reset enabling the CPU to generate another CPU clock signal and initiate another delay cycle. This delay cycle may be from 28 to 378 microseconds.

A third latch is reset by a switch after the occurrence of any predetermined condition as determined by the hit signals from the programmable hit matrices and a strobe signal wired by jumpers in a monitor to generate the STPCLK signal, thereby stopping the CPU clock. The CPU clock is reinitiated by resetting the switch.

BRIEF DESCRIPTION OF THE DRAWINGS

The novel features which are characteristic of the invention are set forth with particularity in the appended claims. The invention itself, however, both as to organization and operation may best be understood by reference to the following description in conjunction with the drawings in which:

FIGS. 5a-5j show the various system, cache and CPU bus information formats;

FIG. 6 is a table of the control signal codes which identify the information formats of FIGS. 5a-5j;

FIGS. 7 and 8 are logic diagrams of the PHM's used to describe a specific example to demonstrate the invention;

FIG. 9 shows the system bus information received by the HMIU during the load mode;

FIG. 10 is a logic diagram of the PHM load operation;

DESCRIPTION OF THE PREFERRED EMBODIMENT

Figure 1:
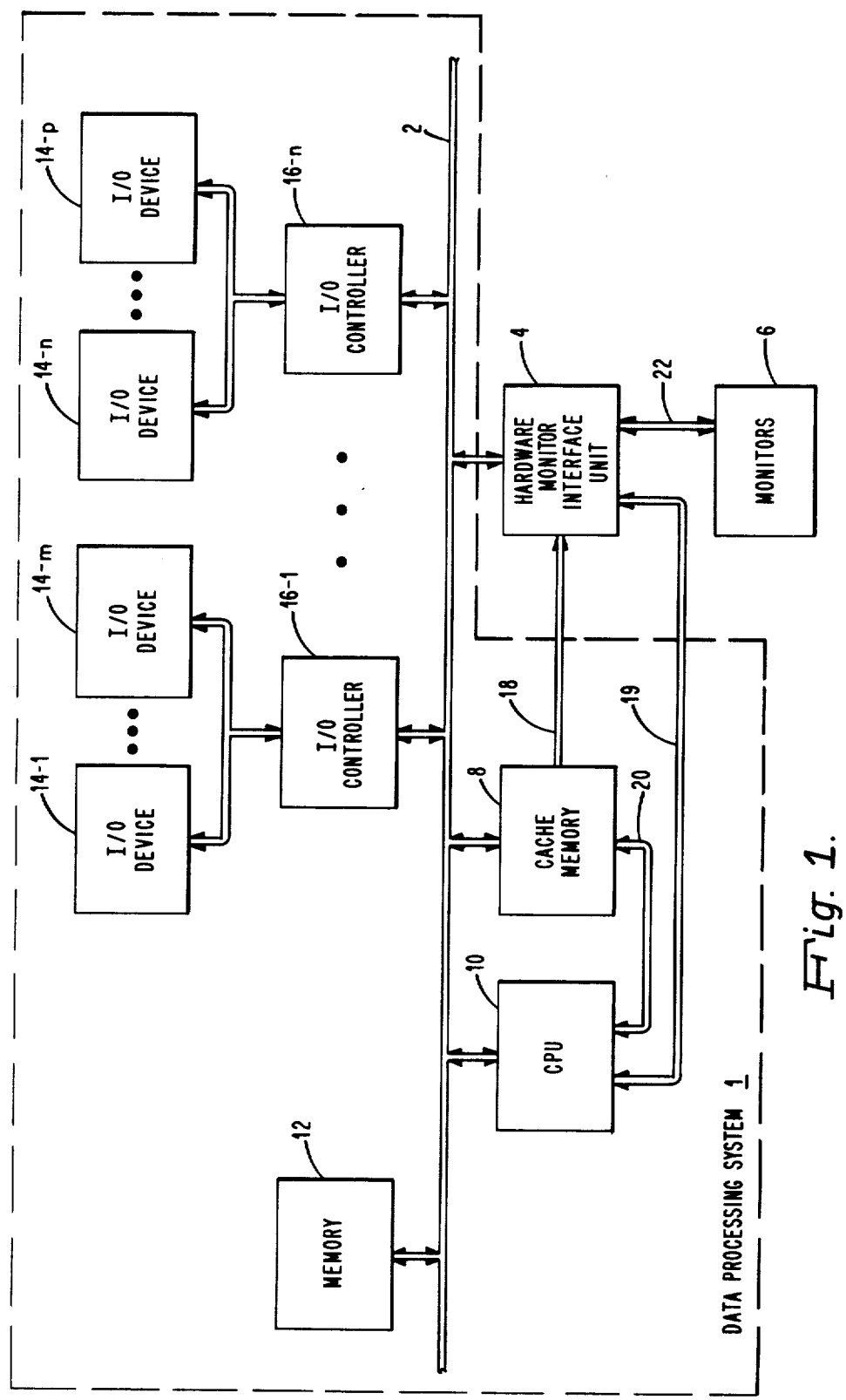
FIG. 1 is an overall block diagram of the data processing system, the hardware monitor interface unit (HMIU) and the monitors.

FIG. 1 shows an overall block diagram of data processing system 1, a hardware monitor interface unit (HMIU) 4 and monitors 6. Data processing system 1 includes a memory 12, a plurality of I/O controllers 16-1 through 16-n, a central processing unit (CPU) 10, and a cache memory 8, all coupled in common to a system bus 2. I/O devices 14-1 through 14-m are coupled to I/O controller 16-1 and I/O devices 14-n through 14-p are coupled to I/O controller 16-n. The CPU 10 is coupled to the cache memory 8 by a bus 20. The CPU 10-cache 8 operation is described in U.S. Pat. No. 4,167,782 entitled "Continuous Updating of Cache Store".

The HMIU 4 is coupled to the system bus 2, to the CPU 10 by bus 19, and to the cache memory 8 by a bus 18. Monitors 6 is coupled to the HMIU 4 by a bus 22.

Memory 12 stores information including instructions and data. Cache 8 stores some of the information that is also stored in memory 12 that is most likely to be requested by CPU 10. Since cache 8 has a much faster access time than memory 12, use of the information stored in cache 8 by CPU 10 increases the system throughput over the CPU 10 requesting the information of memory 12. With the exception of the transfer of information over bus 20, all other information between subsystems is transferred over system bus 2. Since the HMIU 4 is coupled to system bus 2 as well as to CPU 10 and cache 8, HMIU 4 can sample all information passing through data processing system 1 and send desired portions of that information in monitors 6. For example, the HMIU 4 may send over bus 22 to monitors 6 signals indicating a memory 12 read cycle, an add instruction, a cache 8 "hit" or "miss", etc. This enables monitors 6 to generate performance information to indicate, for example, the overall system throughput, or whether the system is CPU or peripheral limited. The HMIU 4 is primarily used in providing information which allows the system to be timed to optimum performance. This information is a help to the hardware designer or software designer information to enable bottlenecks to be designed out of the hardware or software system and is also an aid in debugging both the hardware and software.

The monitors 6 which are commercially available as described supra may include a patchboard, a number of logic gates, some counters and possibly a magnetic tape unit. The HMIU 4 output signals terminate in the patchboard and may be plugged into the logic gates and counters. An example of the use of the HMIU 4 and monitors 6 is described infra.

Figure 2:
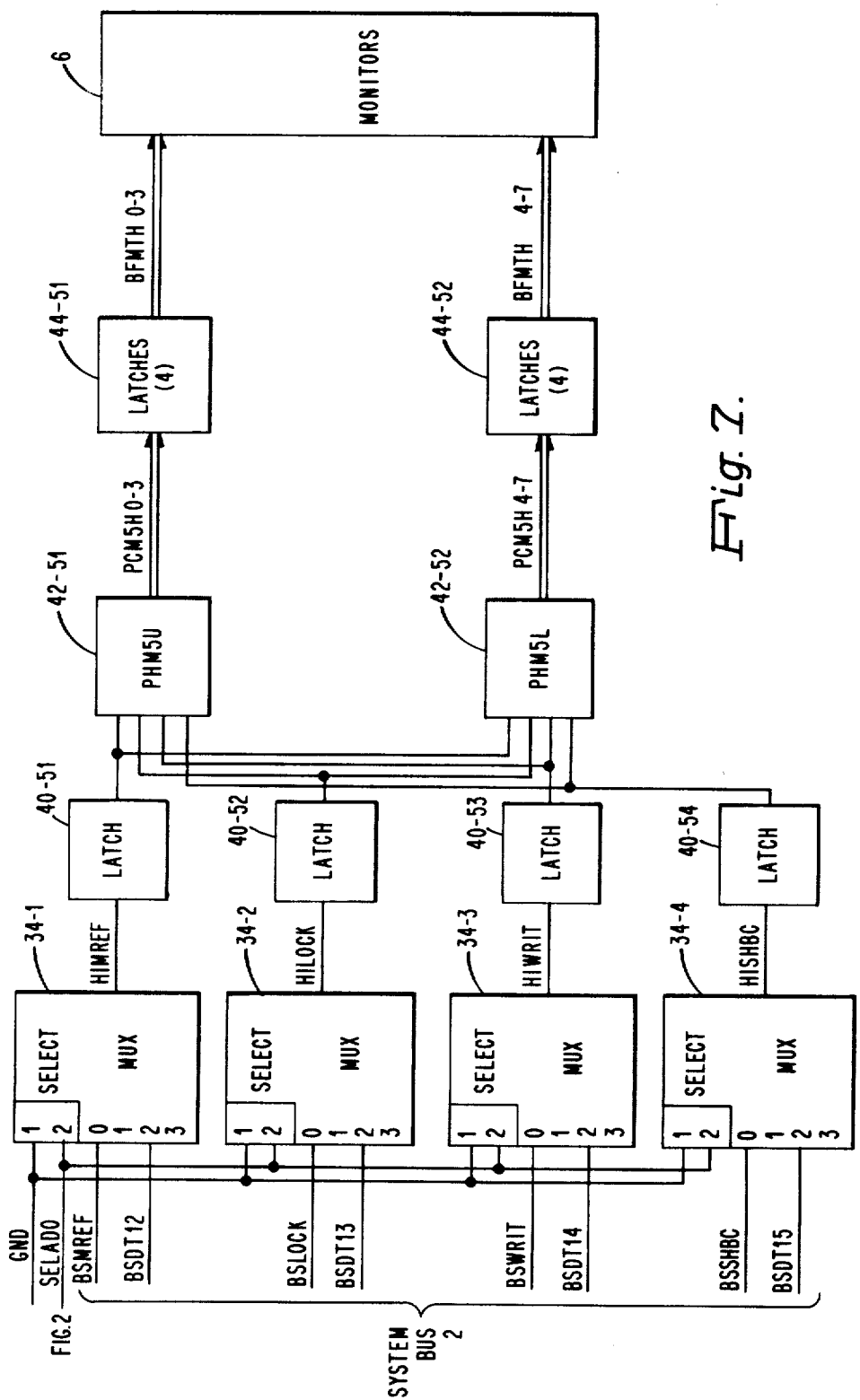
FIG. 2 is a block diagram of the HMIU.

FIG. 2 is a logic block diagram of the HMIU 4 which includes six programmable hit matrices (PHM's) 0-5 42 and three programmable hit matrices 6-8 45.

The 44 input signals to PHM 0-5 42 are stored in 44 latches 40 and the 28 input signals to PHM 6-8 45 are stored in 7 multiplexer (MUX) latches 41. The number over a slashed line indicates the number of signal lines. The latches 40 generate 44 signals to PHM 0-5 42 and 40 signals to latches 50.

The 48 output signals from PHM 0-5 42 are stored in 48 latches 44 and the 24 output signals from PHM 6-8 45 are stored in 24 latches 52. Each of the nine PHM's includes a number of Texas Instruments 3101A random access memories (RAM's). Each 3101A RAM stores 4 bits in each of 16 address locations. Each of the nine PHM's provides 8 output signals to monitors 6 via latches 44 and 52.

Figure 3:
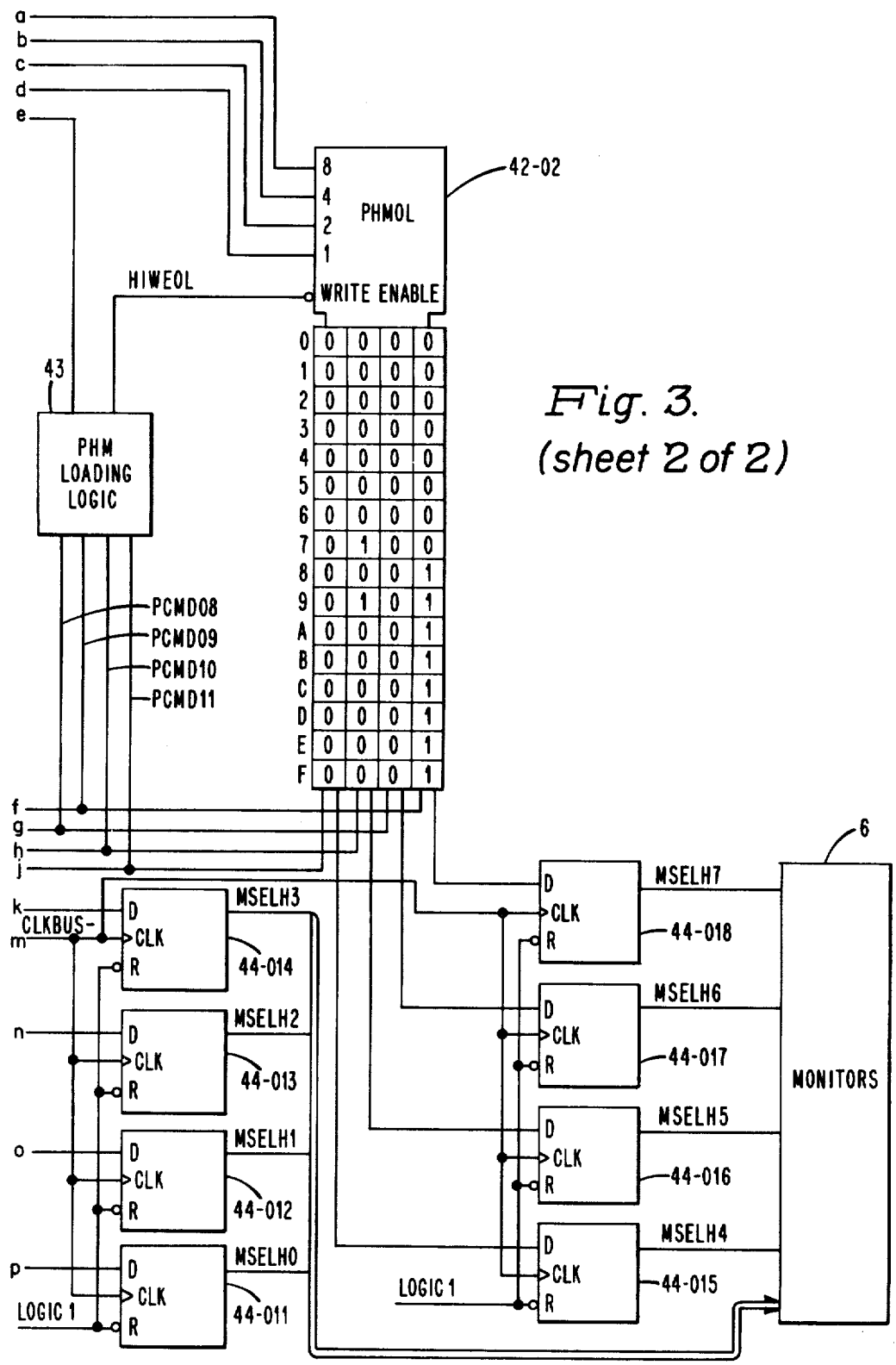
FIG. 3 is a logic diagram of a programmable hit matrix (PHM)

FIG. 3 shows a possible layout of PHMOU 42-01 and PHMOL 42-02 which can be viewed as a matrix of binary cells having 16 rows and 8 columns. PHMOU 42-01 has 4 columns and PHMOL 42-02 has 4 columns. Each of the 8 hit latches 44-011 through 44-018 is associated with one of the 8 columns. A binary ONE in a column of a selected row indicates a "hit". Latches 40-011 through 40-014 are set by signals H1AD 00-03 on the rise of clock signal CLKBUS+ from a megabus interface synchronization logic 32 to select one of the 16 rows. In the example in FIG. 3, a "hit" will set latch 44-011 when row $6_{16}$ is addressed and force signal MSELH0 to logical ONE. A "hit" will set latch 44-012 when either row $6_{16}$, row $A_{16}$ or row $E_{16}$ is addressed and force signal MSELH1 to logical ONE. A "hit" will be indicated in hit register 44-016 when either row $7_{16}$ or 9 $_{16}$ is addressed and a "hit" will set latch 44-018 when one of the rows $8_{16}$ through $F_{16}$ is addressed and force signal MSELH7 to logical ONE. Latches 44-011 through 44-018 are set on the rise of clock signal CLKBUS— from megabus interface synchronization logic 32. Latches 40-011 through 40-014 and 44-011 through 44-018 are 74S174 circuits.

Referring to FIG. 2, a mode switch 30 has 5 positions. In a load mode, the mode switch 30 in switch position 4 conditions mode control 36 to provide complementary signals H1ACKE+ and H1ACKE—. The load mode is described in copending related application Ser. No. 307,569 entitled "Apparatus for Loading Programmable Hit Matrices Used in a Hardware Monitoring Interface Unit". A megabus response logic 33 is responsive to signal H1ACKE+ to receive system bus 2 control signals addressing the HMIU 4 for transferring data signals BSDT 00-15 from memory 12 through MUX's 34 and 41 and using PHM loading logic 43 for storing in the PHM's 0-5 42 and the PHM's 6-8 45. In switch positions 0 and 2, no such signals are generated making MUX's 34 responsive to the system bus 2 address signals BSAD 00-23, data signals BSDT 00-15 and the control signals BSMREF, BSLOCK, BSWRIT and BSSHBC; and MUX latches 41 responsive to CPU bus 19 signals BIXX 10-1F and CPNA 00-11. In switch positions 1 and 3, select signals SELAD 0-1 from mode control 36 activate MUX's 34 to condition the HMIU 4 to be responsive to the cache memory 8 signals CADP 01-08, 10-17 received from cache bus 18. Switch positions 2 and 3 generate signal CPSTPE. CPU clock control 38 is responsive to signal CPSTPE to generate a STPCLK signal to slowdown or stop the CPU 10 clock. Switch position 2 conditions the HMIU 4 to be responsive to system bus 2 signals and switch position 3 conditions the HMIU 4 to be responsive to cache memory 8 signals received from cache bus 18. The 44 MUX's 34 are 74S153 circuits and the 7 MUX latches 41 are 74298 circuits.

Megabus interface synchronization logic 32 synchronizes the timing of the HMIU 4 to the system bus 2 in response to a timing signal BSDCND or to a load mode signal PCMADR, and to the cache bus 18 in response to the cache done timing signal CYCADN for generating the clock signal CLKBUS+, the delayed clock signal CLKBUS— and a strobe signal STBBUS. Mode control 36 signals SELAD0-1 select the system bus 2 timing signal BSDCND, the load mode signal PCMADR, or the cache bus 18 timing signal CYCADN for generating the signals CLKBUS and STBBUS.

CPU interface synchronization logic 46 synchronizes the timing between the HMIU 4 and CPU 10 via signal CPUCLK from CPU 10 via CPU bus 19 for generating clock signal CLKCPU+, the delayed clock signal CLKCPU— and a strobe signal STBCPU. Signal H1ACKE— disables the CPU interface synchronization logic 46 during the load mode. The CPU interface synchronization logic 46 and the megabus interface synchronization logic 32 are described in copending related application Ser. No. 307,565 entitled "Clocking System for a Computer Performance Monitoring Device".

CPU clock control 38 receives the CPUCLK clock signal from the CPU 10 over CPU bus 19 and sends back a STPCLK signal. The CPU clock control 38 is responsive to a CPSTPE signal from the mode control 36 and also a manually operated potentiometer to control the clock rate of the STPCLK signal. CPU 10 is responsive to the STPCLK signal received over CPU bus 19 to operate in either a slowdown or a stop mode.

Mode switch 30 position 4 selects the load mode operation resulting in mode control 36 generating signal H1ACKE+. This enables megabus response logic 33 to receive information on system bus 2 read from memory 12 which is addressed to the HMIU 4. Signals BSAD 8-17 designate a channel number. Switches (not shown) in the megabus response logic 33 are set to respond to an assigned channel number. When that assigned channel number appears on the system bus 2, megabus response logic 33 generates signal PCMADR on a first system bus 2 cycle and signal PCMDAT on a second system bus 2 cycle. Signal PCMADR is applied to the megabus interface synchronization logic 32 and the CPU interface synchronization logic 46 to generate clock signals and strobe signals during the first system bus 2 cycle. Signal PCMDAT is applied to PHM loading logic 43. The data signals BSDT 00-15 are clocked into the PHM loading logic 43 by signal PCMDAT. Address signal BSAD 21, signal PCMDAT and the data signals BSDT 00-03 select one of the six PHM's 0-5 42 or one of the three PHM's 6-8 45 into which signals BSDT 04-15 received on the second system bus 2 cycle are written at an address specified by signals BSDT 00-15 received during the first system bus 2 cycle applied to MUX's 34 for writing into PHM's 0-5 42 and signals BSDT 04-15 applied to MUX latches 41 for writing onto PHM's 6-8 45. The system bus 2 operation including channel number is described in U.S. Pat. No. 4,030,075 entitled "Data Processing System Having Distributed Priority Network".

An ordered pair of separate system 2 bus cycles are required for writing into each address location for each desired PHM. Since the 3101A RAM has 4 outputs and 8 outputs are required for each of the nine PHM's, the 3101A RAM's operate in pairs similar to RAM's 42-01 and 42-02 of FIG. 3. One of the write enable signals H1WEU 0-8 from PHM loading logic 43 of FIG. 2 selects the upper random access memory in the selected PHM. One of the write enable signals H1WEL 0-8 selects the lower random access memory in the selected PHM.

The 44 MUX's 34 under the control of the mode control signals SELAD0-1 select the system bus 2 address signals BSAD 00-23, the system bus 2 data signals BSDT 00-15, the cache bus 18 address signals CAHA 03-22 and the cache bus 18 data signals CADP 01-08, 10-17. Also applied to MUX's 34 are the system bus 2 control signals BSMREF, BSLOCK, BSWRIT and BSSHBC. Signal BSMREF indicates a memory 12 system bus 2 cycle, signal BSWRIT indicates a system bus 2 write cycle, signal BSLOCK indicates that the memory 12 is locked out and not available to memory requests since the memory 12 has not completed a multicycle transfer, and signal BSSHBC indicates a second half bus cycle, that is, a response to a previous bus cycle which requested information. These operations are described in U.S. Pat. No. 4,000,485 entitled "Data Processing System Providing Locked Operation of Shared Processes".

The outputs of MUX's 34 are stored in 44 latches 40 on the rise of clock signal CLKBUS+ from megabus interface synchronization logic 32. The 44 output signals of latches 40 are applied to the address terminals of PHM 0-5 42. The 40 output signals of latches 40 representative of the 24 bus address signals and the 16 data signals received over either system bus 2 or cache bus 18 are stored in the 40 latches 50 on the rise of the CLKBUS— clock signal for transfer to monitors 6. Four of the MUX latches 41 store the 16 system bus 2 data signals BSDT 00-15 or the 16 CPU bus 19 signals BIXX 10-1F from the CPU 10 internal bus for addressing PHM's 6 and 7 45. The 4 CPU bus signals BIXX 0C-0F are stored in 4 input latches 47 on the rise of the clock signal CLKCPU— and stored in 4 of the 32 latches 54 on the next rise of the CLKCPU— clock signal. The remaining three of the MUX latches 41 store the data signals BSDT 08-15 or the CPU 10 control store address signals CPNA 00-11 received over CPU bus 19 for addressing PHM 8 45. These signals are stored in MUX latches 41 on the rise of clock signal. CLKCPU+. The PHM 6-8 output signals are stored in 24 latches 52 on the rise of the clock signal CLKCPU—. The output signals of the 7 MUX latches 41 are stored in 28 latches 54 on the rise of the clock signal CLKCPU—.

Figure 4:
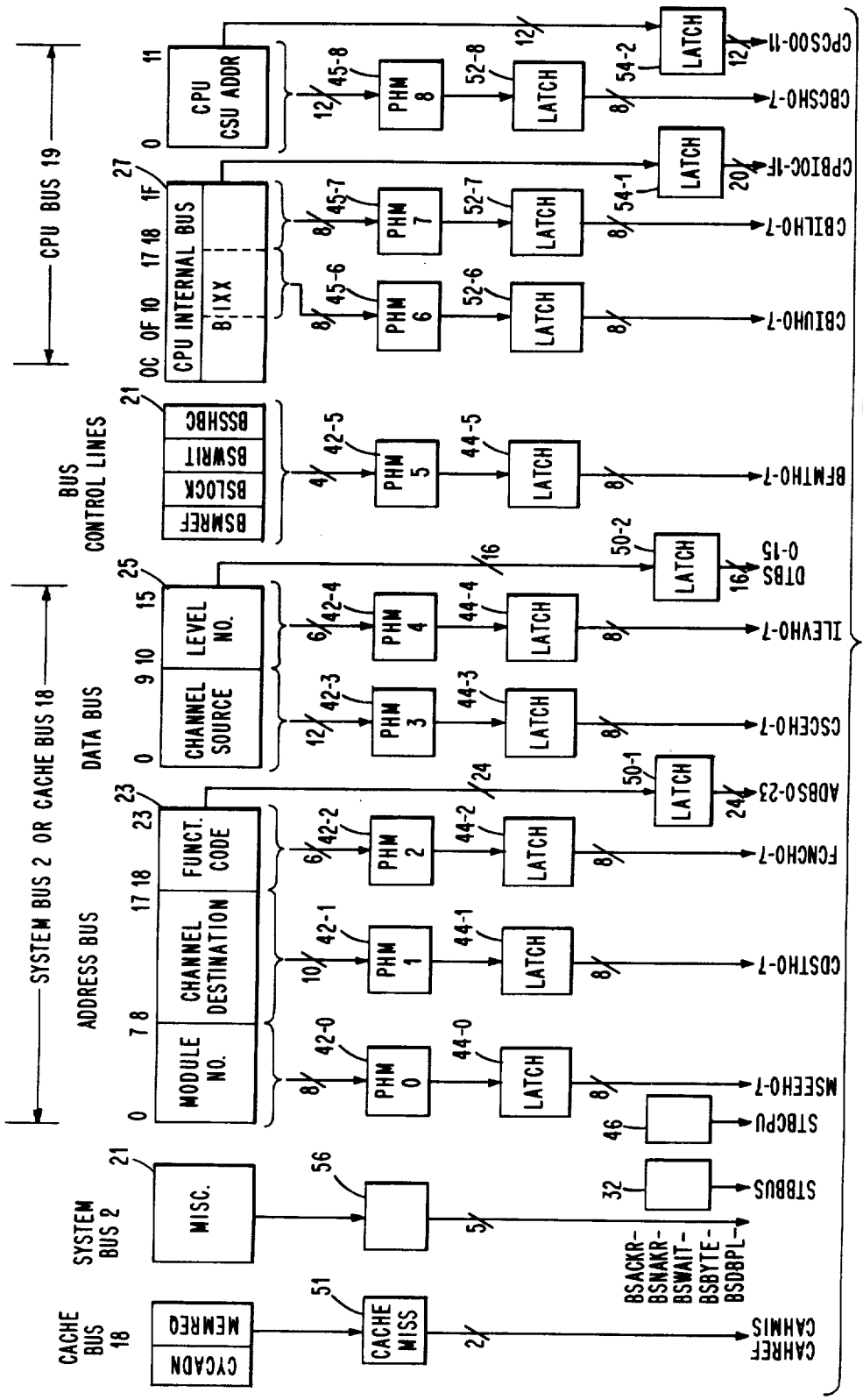
FIG. 4 shows the coupling between the PHM's and the system bus 2, the cache bus 18 and the CPU bus 19 signals; and the output signals to the monitors.

Five control signals described infra are received via system bus 2 stored in 5 latches 49 on the rise of the clock signal CLKBUS+. These control signals are shown in FIG. 4. The outputs of latches 49 are stored in latches 56 on the rise of the CLKBUS— signal for transfer to monitors 6. The latches 40, 44, 49, 50, 52, 54 and 56 are 74S174 circuits.

A cache miss logic 51 receives a MEMREQ signal and the CYCADN signal from cache 8 via cache bus 18. The MEMREQ signal indicates that the CPU 10 requested information from cache 8 which was not stored in cache 8. Signal CYCADN indicates that the information was found in or received by cache 8 and sent to CPU 10. Cache miss logic 51 generates signal CAHREF to indicate a cache 8 request and a signal CAHMIS to indicate that the information was not found in cache 8. Signals CAHREF and CAHMIS are applied to monitors 6 to measure the cache 8 "hit" rate.

The 149 output signals from latches 44, 50, 52, 54 and 56, two strobe signals STBBUS and STBCPU, and the two cache miss logic 51 signals CAHREF and CAHMIS are applied to the monitors 6.

Referring to FIG. 3, the PHM loading logic 43 generates the write enable signal H1WE0L to write into PHM0L 42-02 or the write enable signal H1WE0U to write into PHM0U 42-01. Signals BSDT 00-15 are stored in the PHM loading logic 43, FIG. 2, on the second system bus 2 cycle and written into PHM0U 42-01 or PHM0L 42-02 via signals PCMD 08-11 at an address specified by signals H1AD 00-03 received and stored in latches 40-011 through 40-014 from MUX's 34-01 during the first system bus 2 cycle.

FIG. 4 is a block diagram showing the information sent by the HMIU 4 to the monitors 6. The table below describes the function of the 5 system bus 2 signals received over system bus 2 and stored in latches 49 for transfer to monitors 6 via latches 56:

BSACKR—: Acknowledges the acceptance of a bus transfer.

BSNAKR—: Refuses a bus transfer.

BSWAIT—: Indicates that the subsystem is busy and cannot accept the bus transfer at this time.

BSBYTE—: Indicates that the information on the bus is a byte and not a word.

BSDBPL—: Indicates that a double word was requested of memory 12.

The following two cache signals are generated in cache miss logic 51:

CAHREF: Indicates that the CPU 10 referenced the cache memory 8 by the HMIU 4 receiving a cache done signal CYCADN over cache bus 18 to strobe the data into the CPU 10 from either cache 8 or memory 12.

CAHMIS: Indicates that the cache memory 8 generated a memory request MEMREQ signal over cache bus 18 thereby indicating a "cache miss".

FIGS. 5a-5j show the various formats received by HMIU 4. FIG. 4 uses the address format of FIG. 5g and the data format of FIG. 5j to describe the relationship of the PHM's to the system bus 2 or cache bus 18 information. This is an arbitrary selection.

Referring to FIG. 4, the input latches 40 and 49 and the MUX latches 41 are not shown. When MUX's 34 couple system bus 2 to the HMIU 4, address bus 23 signals BSAD 00-07 address PHM 0 42-0 to verify the memory 12 modules.

When the cache bus 18 is coupled to the HMIU 4 by MUX's 34, address bus 23 signals CAHA 03-07 address PHM 0 42-0 to verify the memory 12 module. The PHM 0 42-0 output signals are stored in 8 latches 44-0. The latches 44-0 output signals MSELH 0-7 are applied to monitors 6 to designate a hit on designated memory 12 module or modules.

When the MUX's 34 couple system bus 2 to the HMIU 4, address bus 23 signals BSAD 08-17 address PHM 1 42-1 to, for example, verify the channel number of the subsystem which is the destination of the information being transferred over system bus 2 during this bus cycle. When the cache bus 18 is coupled to the HMIU 4, address bus 23 signals CAHA 08-17 address PHM 1 42-1 to, for example, verify the destination channel numbers. The PHM 1 42-1 output signals are stored in 8 latches 44-1. The latches 44-1 output signals CDSTH 0-7 are applied to monitors 6 to designate a "hit" on channel number.

When the MUX's 34 couple system bus 2 to the HMIU 4, address bus 23 signals BSAD 18-23 address PHM 2 42-2 to, for example, verify the function code. The function code specifies the function to be performed by an I/O device 14-n and whether it is input or output data transferred from or to the device. When the cache bus 18 is coupled to the HMIU 4, address bus 23 signals CAHA 18-22 address PHM 2 42-2 to, for example, verify the function code. The PHM 2 42-2 output signals are stored in 8 latches 44-2. The latches 44-2 output signals FCNCH 0-7 are applied to monitors 6 to designate a "hit" on function code.

The 24 address bus 23 signals are applied through the MUX's 34 to 24 latches 50-1 of latches 50, FIG. 2. The output signals ADBS 0-23 are applied to monitors 6.

When the MUX's 34 couple system bus 2 to the HMIU 4, data bus 25 signals BSDT 00-09 address PHM 3 42-3 to, for example, verify the channel number of the source. When the cache bus 18 is coupled to the HMIU 4, data bus 25 signals CADP 01-08, 10-11 address PHM 3 42-3. The PHM 3 42-3 output signals are stored in 8 latches 44-3. The latches 44-3 output signals CSCEH 0-7 are applied to monitors 6 to designate the specified source channel number "hit".

When the MUX's 34 couple system bus 2 to the HMIU 4, data bus 25 signals BSDT 10-15 address PHM 4 42-4 to, for example, verify the level number which is an indication of the priority of an interrupt. A lower level number indicates a higher priority. When the cache bus 18 is coupled to the HMIU 4, data bus 25 signals CADP 12-17 address PHM 4 42-4. The PHM 4 42-4 output signals are stored in 8 latches 44-4. The latches 44-4 output signals ILEVH 0-7 are applied to monitors 6 to designate an interrupt priority level number.

The 16 data bus 25 signals are applied through MUX's 34 to 16 latches 50-2 of latches 50, FIG. 2. The output signals DTBS 00-15 are applied to monitors 6.

When the MUX's 34 couple system bus 2 to the HMIU 4, the control bus 21 signals BSMREF, BSLOCK, BSWRIT and BSSHBC address PHM 5 42-5. The PHM 5 42-5 output signals are stored in 42-5. The latches 44-5 output signals BFMTH 0-7 are applied to monitors 6.

MUX latches 41 select signals BIXX 10-17 from CPU bus 19 for addressing PHM 6 45-6 and signals BIXX 18,19,1A-1F from CPU bus 19 for addressing PHM 7

45-7. CPU bus 19 brings over, for example, the 4 hexadecimal digits making up the instruction operation code, 2 of the 4 hexadecimal digits address PHM 6 45-6, and 2 of the 4 hexadecimal digits address PHM 7 45-7. The PHM 6 45-6 and PHM 7 45-7 output signals are stored in latches 52-6 and 52-7, respectively, and the output signals CBIUH 0-7 and CBILH 0-7 are applied to the monitors 6 to indicate an operation code "hit", the operation code received over internal CPU bus 27 is stored in 16 latches 54-1 of latches 54, FIG. 2. Signals BIXX 0C-0F are stored in 20 output latches 54-1 and are transferred to monitors 6 as signals CPBI 0C-1F.

MUX latches 41 also store the CPU 10 control store address signals CPNA 00-11 from bus 19 for addressing PHM 8 45-8. The PHM 8 45-8 output signals are stored in 8 latches 52-8. The latches 52-8 output signals CPCSH 0-7 are applied to monitors 6 to indicate control store address "hits". The control store address is also stored in latches 54-2 of latches 54, FIG. 2, for transfer to monitors 6 as signals CPCS 00-11.

FIGS. 5a-5j show the various address bus 23 and data bus 25 formats, a combination of which is shown in FIG. 4. These formats are further described in the Honeywell Level 6 Microcomputer Handbook, Order No. AS22.

FIG. 5a shows the formats of the information on system bus 2 during a memory 12 write cycle. Bit position 23 of address bus 23 indicates if the data bus 25 is in a byte or word format.

FIG. 5b shows the format of the information on system bus 2 during a first cycle of a memory 12 read sequence. FIG. 5c shows the format during a second cycle of a memory read sequence.

FIG. 5d shows the format of the information on the system bus 2 during an I/O output command.

FIG. 5e shows the format of the information on system bus 2 during an I/O input command and FIG. 5f shows the format of the response.

FIGS. 5g and 5h show the two system bus 2 cycles of information responsive to an I/O load command.

FIG. 5i shows the system bus 2 information requesting a CPU 10 action.

FIG. 5j shows the system bus 2 information during an interrupt by one of the devices 14.

FIG. 6 shows formats of the different types of bus transfers as identified by the control signals.

The following example shows how the HMIU 4 monitors the data processing system 1 operation.

Assume it is required to count the number of times the system writes into memory 12 at address location $00004_{16}$. Referring to FIGS. 5 and 6, for a memory write operation signal BSMREF is at logical ONE, signal BSMLOCK is either at logical ONE or logical ZERO indicating a "don't care", signal BSWRIT is at logical ONE and signal BSSHBC is a "don't care".

During the load operation, binary ONE's are written into address locations $1010_2$, $1011_2$, $1110_2$ and $1111_2$ or $A_{16}$, $B_{16}$, $E_{16}$ and $F_{16}$ of PHM5U 42-51 or PHM5L 42-52 of FIG. 7. The addresses are selected during the load mode by data signals BSDT 12-15 since select signal SELAD0 from mode control 36 selects input terminal 2 of MUX's 34-1 through 34-4. The MUX's 34-1 through 34-4 output signals H1MREF, H1LOCK, H1WRIT and H1SHBC are stored in latches 40-51 through 40-54 to address PHM5U 42-51 and PHM5L 42-52. The signals for writing the binary ONE's in the selected addresses are not shown. Assume that the binary ONE's indicating a "hit" are written into PHM5U 42-51 such that signal PCM5H0 is stored in one of the latches 44-51 and appears as signal BEMTH0. During the load mode, the binary ONE's representing a "hit" could have been written in PHM5U 42-51 or PHM5L 45-52 to appear on any other of the signals PCM5H 1-7 and BFMTH 1-7 when address locations $A_{16}$, $B_{16}$, $E_{16}$ and $F_{16}$ are addressed. The choice is arbitrary.

Address bus 23 of FIG. 5 will receive the information in the format of FIG. 5a. Signals BSAD 03-22 indicates an address location $00004_{16}$. Signal BSAD 20 is at logical ONE and signals BSAD 03-19,21-22 are at logical ZERO.

Referring to FIG. 8, during a load operation binary ONE's indicating a "hit" are written into address location $0_{16}$ of PHM0L 42-02 and 42-04 so as to appear on signal MSELH4, the output of one of the latches 44-02. As described supra, this is arbitrary; the binary ONE's could be written to appear on signals MSELH 0-3,5-7. During the load operation, signal SELAD0 is at logical ONE resulting in MUX's 34-01 and 34-02 selecting signals BSDT 8-15. Signals BSDT 8-15 select address location $00_{16}$. Similarly, during the load operation address locations $0_{16}$ of PHM1L 42-12, 42-14 and 42-16 are addressed by data signals BSDT 06-15 to write a binary ONE so that signal CDSTH 5-7, the output of one of the latches 44-12, is active. Also, during the load operation address location $0_{16}$ of PHM2L 42-22 and address locations $8_{16}$ and $9_{16}$ of PHM2L 42-24 (signal BSAD 20 is at logical ONE and signal BSAD 23 is at "don't care") are addressed by signals BSDT 10-15 applied to MUX's 34-21 and 34-22 to write binary ONE's in PHM2L 42-22 and 42-24 so that signal FCNCH6, the output of latches 44-22, is active.

When the HMIU 4 is monitoring the system bus 2, signals BSAD 0-23 are applied through MUX's 34-01, 34-02, 34-11, 34-12, 34-13, 34-21 and 34-22 to be stored in their respective latches 40-01, 40-02, 40-11, 40-12, 40-13, 40-21 and 40-22 since signals SELAD0-1 are both at logical ZERO. Assuming a memory 12 write operation, signal BEMTH0, FIG. 7, at logical ONE, then signals BSAD 0-2 are at logical ZERO and the memory 12 address location signals BSAD 3-22 indicate the memory 12 address location.

Signals BSAD 0-3 at logical ZERO applied to MUX's 34-01 are stored in latches 40-01 as logical ZERO's. Signals H1AD 00-03 at logical ZERO are applied to the address terminals of PHM0U 42-01 and PHM0L 42-02 where locations $0_{16}$ are addressed.

Signal PCM0H4, an output of PHM0L 42-02, is forced to logical ONE. Similarly, signals BSAD 4-7 at logical ZERO are stored in latches 40-02 through MUX's 34-02. Signals H1AD 04-07 address location $0_{16}$ of PHM0U 42-03 and PHM0L 42-04. Signal PCM0H4, an output of PHM0L 42-04, is forced to logical ONE. Both signals PCM0H4 are applied to an AND junction 81. If both are at logical ONE, then a selected latch of latches 44-02 is set and signal MSELH4 is forced to logical ONE.

Signals BSAD 8-9, BSAD 10-13 and BSAD 14-17 at logical ZERO applied to MUX's 34-11, 34-12 and 34-13, respectively, are stored in latches 40-11, 40-12 and 40-13 respectively. The PCM1H5 output signals at logical ONE from PHM1L 42-12, 42-14 and 42-16 are applied to an AND junction 83. A selected latch of latches 44-12 is set, forcing signal CDSTH5 to logical ONE.

Signals BSAD 18-19,21-22 at logical ZERO, signal BSAD 20 at logical ONE and signal BSAD 23 at either logical ONE or logical ZERO (a "don't care" indication) generate signal FCNCH6 at logical ONE via MUX's 34-21 and 34-22, latches 40-21 which stores $0_{16}$ and latches 40-22 which stores $8_{16}$ or $9_{16}$. Signals H1AD 18-19,21-22 at logical ZERO, signals H1AD 20 at logical ONE and signal H1AD 23 at either logical ONE or logical ZERO. The output signals PCM2H6 from PHM2L 42-22 and PHM2L 42-24 at logical ONE applied to AND junction 85 set a selected one of the latches 44-22 forcing signal FCNCH6 to logical ONE.

Signals MSELH4, CDSTH5, FCNCH6 and BEMTH0 at logical ONE indicating a memory 12 write cycle at address location $00004_{16}$ are plug-wired to an AND gate 6-2 in monitors 6. When signal BSACKR, FIG. 2, applied to AND gate 6-2 is at logical ONE indicating that the memory 12 acknowledged the system bus 2 cycle and when the strobe signal STBBUS from megabus interface synchronization logic 32, FIG. 2, is at logical ONE, counter 1 is incremented.

The PHM's 0-5 42 and PHM's 6-8 45 of FIG. 2 are loaded by placing mode switch 30 in the load mode and initiating prescribed software sequences in CPU 10 and memory 12 which send out a load address system bus 2 cycle followed by a load data system bus 2 cycle. The load address cycle specifies a PHM module address. Sixteen address cycles and sixteen data cycles are required to load an entire PHM module.

As an example, referring to FIG. 8, PHM1U 42-11, 42-13 and 42-15 are loaded in sixteen address cycles and sixteen data cycles. To load address location $C_{16}$ during the address cycle, signals BSDT 6,7 applied to MUX 34-11, signals BSDT 08-11 applied to MUX 34-12, and signals BSDT 12-15 applied to MUX 34-13 select address location $C_{16}$ in PHM1U 42-11, 42-13 and 42-15. The address location $C_{16}$ is stored in latches 40-11, latches 40-12 and latches 40-13.

The data cycle following the address cycle includes signal BSAD 21 at logical ZERO to select PHM1U 42-11, 42-13 and 42-15 via signal H1WEU1. The signals BSDT 0-3 received during the data cycle for this example select the write enable signal H1WEU1. The data signals BSDT 04-15 are stored in PHM loading logic 43 and the output signals PCMD 04-07 are written into address location $C_{16}$ of PHM1U 42-11, output signals PCMD 08-11 are written into address location $C_{16}$ of PHM1U 42-13 and signals PCMD 12-15 are written into address location $C_{16}$ of PHM1U 42-15. To load the 16 address locations therefore requires 16 address cycles and 16 data cycles. To load the entire PHM 1 42-11 through 42-16 requires 32 address cycles and 32 data cycles.

FIG. 9 shows the format of the system bus 2 address cycle and data cycle for the load mode operation.

The HMIU 4 is responsive to its channel number to receive the address signals BSAD 00-23 and the data signals BSDT 00-15. Address signal BSAD 22 at logical ZERO indicates an address cycle and address signal BSAD 22 at logical ONE indicates a data cycle. During an address cycle, signals BSDT 00-15 specify PHM 0-5 42, FIG. 2, and PHM 6-8 45 address locations into which the signals BSDT 04-15 received during the following cycle, which will be a data cycle, are written. During the data cycle, signal BSAD 21 at logical ZERO enables a decoder 43-16 and signal BSAD 21 at logical ONE enables a decoder 43-18. Signals BSDT 00-03 are applied to decoders 43-16 and 43-18 to select the PHM, either upper or lower PHM, that is loaded by signals BSDT 04-15 by generating one of the signals H1WEU 0-8 or H1WEL 0-8 from the enabled decoder 43-16 or 43-18.

Referring to FIG. 10, channel number switches 33-2 are set to the channel number assigned to the HMIU 4. The channel number is received by HMIU 4 from system bus 2 via signals BSAD 08-17. If the channel number is the one assigned to HMIU 4, then signals MYAD 00-09 at logical ONE are applied to a NAND gate 33-8. If the HMIU 4 is in a load mode, signal H1ACKE+ is at logical ONE and if there is a memory 12 system bus 2 cycle, signal BSMREF is at logical ONE and signal MYADDR is forced to logical ZERO indicating that this system bus 2 cycle is either an HMIU 4 load mode address cycle or an HMIU 4 load mode data cycle. Signal BSAD 22 from system bus 2 at logical ZERO sets latch 33-10 on the rise of a clock signal BSDCND via a NAND gate 33-16. Signal BSAD 22 at logical ONE sets a latch 33-12 on the rise of clock signal BSDCND via an inverter 33-20 and a NAND gate 33-18. Signal PCMADR at logical ONE indicates an address cycle and signal PCMDAT at logical ONE indicates a data cycle. Signal PCMADR or signal PCMDAT at logical ONE sends an acknowledge signal BSACKR out on system bus 2 to indicate to memory 12 that the system bus 2 cycle was accepted. The system bus 2 connect and acknowledge logic is described in the aforementioned U.S. Pat. No. 4,030,075.

The PCMADR signal is applied to the megabus interface synchronization logic 32, FIG. 2, and the CPU interface synchronization logic 46 to generate clock pulses CLKBUS and CLKCPU to load signals BSDT 06-15 into latches 40 via MUX's 34 and signals BSDT 04-15 into MUX latches 41 to address PHM 0-5 42 and PHM 6-8 45, respectively. Signals SELAD 0-1 applied to MUX's 34 select the signals BSDT 00-15 and signal H1ACKE+ applied to the MUX latches 41 selects signals BSDT 04-15.

Bus connect signal BSDCNN applied to a delay line 33-4 of FIG. 10 provides the timing between system bus 2 and HMIU 4. The rise of signal BSDCND which is delayed 40 nanoseconds from the rise of signal BSDCNN sets latches 33-10 or 33-12. The latches 33-10 or 33-12 are reset by the fall of signal BSDCNB, the output of an OR gate 33-6. Signal BSDCNB falls 40 nanoseconds after the fall of the connect signal BSDCNN.

During the data cycle, the rise of the PCMDAT signal, the output of latches 33-12, sets signals BSDT 00-15 into 16 latches 43-2 which are 74S174 circuits. The output signals PCMD 00-03 are applied to decoders 43-16 and 43-18. Decoder 43-16 is enabled by signals PCMWRT and PCMHY. Decoder 43-18 is enabled by signals PCMWRT and PCMLO. Latch 43-8 is set on the rise of signal PCMDAT if system bus 2 signal BSAD 21 is at logical ONE. Signal PCMLO enables decoder 43-18 via latch 43-8 and an inverter 43-12. If signal BSAD 21 was at logical ZERO, latch 43-8 is reset on the rise of signal PCMDAT and signal PCMHY enables decoder 43-16. The decoders are 74154 circuits.

Signal PCMWRT is timed to provide a 60 nanosecond pulse, 40 nanoseconds after the rise of signal PCMDAT. Signal PCMDAT is delayed 40 nanoseconds by a delay line 43-4 to generate signal PCMDAT+1D which is applied to a NAND gate 43-12. Signal PCMDAT-2D at logical ONE is also applied to NAND gate 43-12. The output signal PCMWRT falls on the rise of signal PCMDAT+1D. Signal PCMDAT+1D is delayed 60 nanoseconds by a delay line 43-6 which generates signal PCMDAT+2D. An inverter 43-10 applies signal PCMDAT− to NAND gate 43-12 causing signal PCMWRT to rise. Decoder 43-16 or 43-18 enables the 60 nanosecond signal PCMWRT which was at logical ZERO. This is 40 nanoseconds after the signals PCMD 00-03 were applied to the input terminals of the decoders. Therefore, during the data cycle one of the output signals H1WEU 0-8 or H1WEL 0-8 is selected to enable a PHMXU or a PHMXL. As an example, referring to FIG. 8, selecting signal H1WEL 2 will enable PHM2L 42-22 and 42-24. Signals PCMD 08-11 are written into PHM2L 42-22 and signals PCMD 12-15 are written into PHM2L 42-24.

Figure 11:
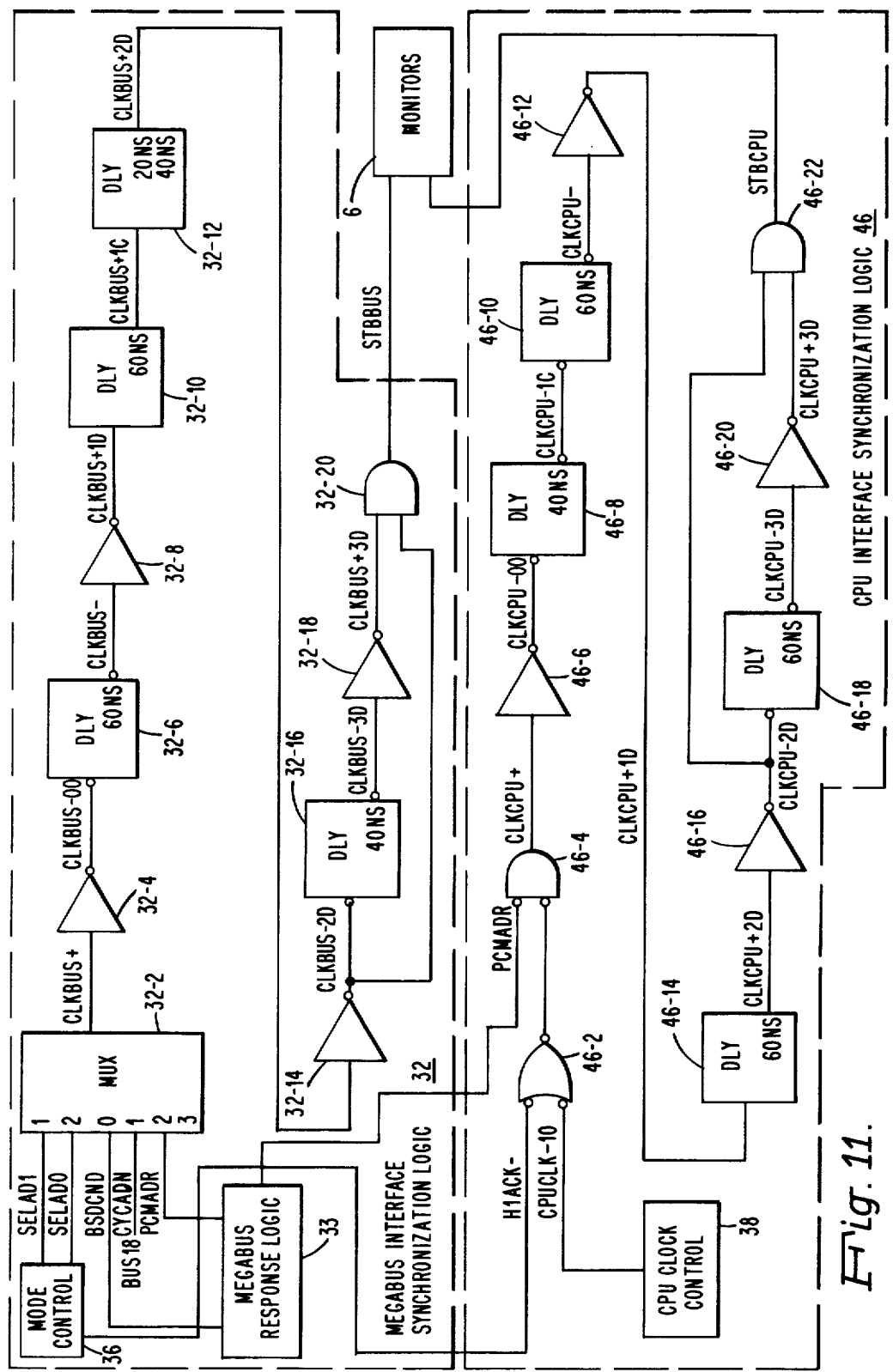
FIG. 11 shows the logic for generating the HMIU clock and strobe signals.

FIG. 11 shows the timing logic of megabus interface synchronization logic 32 and the CPU interface synchronization logic 46 for generating the clock signals CLKBUS+, CLKBUS−, CLKCPU+ and CLKCPU− and the strobe signals STBBUS and STBCPU.

During the load operation, signal H1ACK− at logical ZERO is applied to a NOR gate 46-2. The output enables a NAND gate 46-4 to be responsive to the PCMADR signal which is operative during the address cycle of the load operation. Signal CLKCPU+ is generated by a NAND gate 46-4 and signal CLKCPU− is generated by NAND gate 46-4, an inverter 46-6 and delay lines 46-8 and 46-10 to clock the BSDT 08-15 signals on system bus 2 into the MUX latches 41 via signal CLKCPU+.

During the load operation also, signal SELAD0 from mode control 36 selects signal PCMADR at input terminal 2 thereby generating clock signal CLKBUS+ which clocks the BSDT 00-15 signals into latches 40. Note that the clock signals CLKBUS+, CLKBUS−, CLKCPU+ and CLKCPU− are inoperative during each data cycle of the load operation.

If the CPU 10 is active, then the load operation signal H1ACKE− from mode control 36 at logical ZERO applied to NOR gate 46-2 prevents the clock signal CLKCPU+ from being affected by the CPU clock signal CPUCLK−10 from CPU clock control 38.

During normal system bus 2 operation, MUX 32-2 select signals SELAD0-1 select signal BSDCND from megabus response logic 33 indicating that information is being transferred over system bus 2 and generates clock signal CLKBUS+ and clock signal CLKBUS− from an inverter 32-4.

Mode switch 30 is set to switch positions 1 and 3 to receive cache bus 18 signals. When CPU 10 requests information from cache 8, signals SELAD0-1 select the cache done signal CYCADN which is applied to MUX 32-2 to initiate the clock signals CLKBUS+ and CLKBUS−. Also, during the CPU 10-cache 8 operation, signal CPUCLK−10 from CPU 10 generates the clock signals CLKCPU+ and CLKCPU−. Note that the HMIU 4 is responsive to signals on the CPU bus 19 except during the load operation.

The 40 nanosecond strobe signal STBBUS is generated via the clock signal CLKBUS−00, a 60 nanosecond delay line 32-6, the signal CLKBUS−, an inverter 32-8, a signal CLKBUS+1D, a 60 nanosecond delay line 32-10, a signal CLKBUS+1C, a 20 nanosecond delay line 32-12, a signal CLKBUS+2D, an inverter 32-14, a signal CLKBUS−2D which is applied to a 40 nanosecond delay line 32-16 and an AND gate 32-20. A signal CLKBUS−3D is applied to an inverter 32-18.

The output signal CLKBUS+3D is applied to AND gate 32-20 to generate signal STBBUS.

The 40 nanosecond strobe signal STBCPU is generated via a 40 nanosecond delay line 46-8, a signal CLKCPU−1C, a 60 nanosecond delay line 46-10, the signal CLKCPU−, an inverter 46-12, a signal CLKCPU+1D, a 60 nanosecond delay line 46-14, a signal CLKCPU+2D, an inverter 46-16, a signal CLKCPU−2D and an AND gate 46-22. Signal CLKCPU−2D is also applied to a 60 nanosecond delay line 46-18, a signal CLKCPU−3D, an inverter 46-20 and a signal CLKCPU+3D applied to AND gate 42-22. Strobe signal STBCPU, the output of AND gate 42-22, is applied to monitors 6.

Signal STBBUS is used by the operator to plug into the logic of monitors 6 to time the monitors 6 to the system bus 2 or the cache bus 18. Signal STBCPU is used by the operator to plug into the logic of monitors 6 to time the monitors 6 to the CPU bus 19.

The 40 nanosecond pulses STBCPU and STBBUS are the minimum width pulses which may be reliably used as strobes by the user in the monitors 6. This minimum width allows the user to optimize the use of the varying duration of signals applied to monitors 6 from HMIU 4.

In FIG. 8, the strobe signal STBBUS applied to AND gate 6-2 provides a timed pulse to advance the counter. This prevents spurious counts as the remaining inputs to AND gate 6-2 have been forced to logical ONE.

Figure 12:
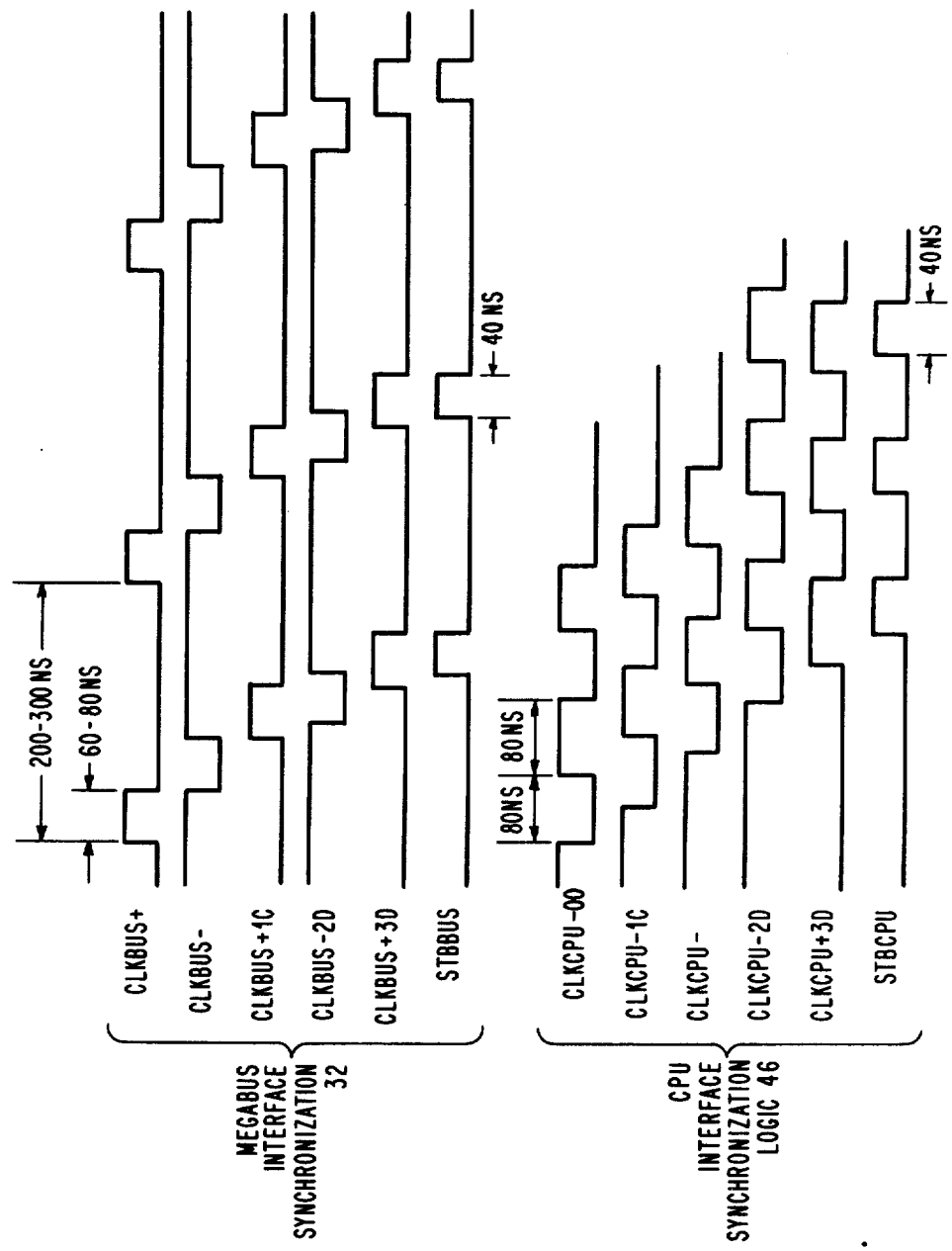
FIG. 12 is a timing diagram of the clock and strobe signals.

FIG. 12 shows the timing of the signals for generating the clock signals and the strobe signals of megabus interface synchronization 32 and the CPU interface synchronization logic 46. The cycle time of the system bus 2 may vary between 200 and 300 nanoseconds. The PCMADR signal is not shown on the timing diagram of FIG. 11; however, it generates clock signal CLKBUS+ every 400 to 600 nanoseconds during the load operation. Signal PCMADR is operative on alternative system bus 2 cycles.

Figure 13:
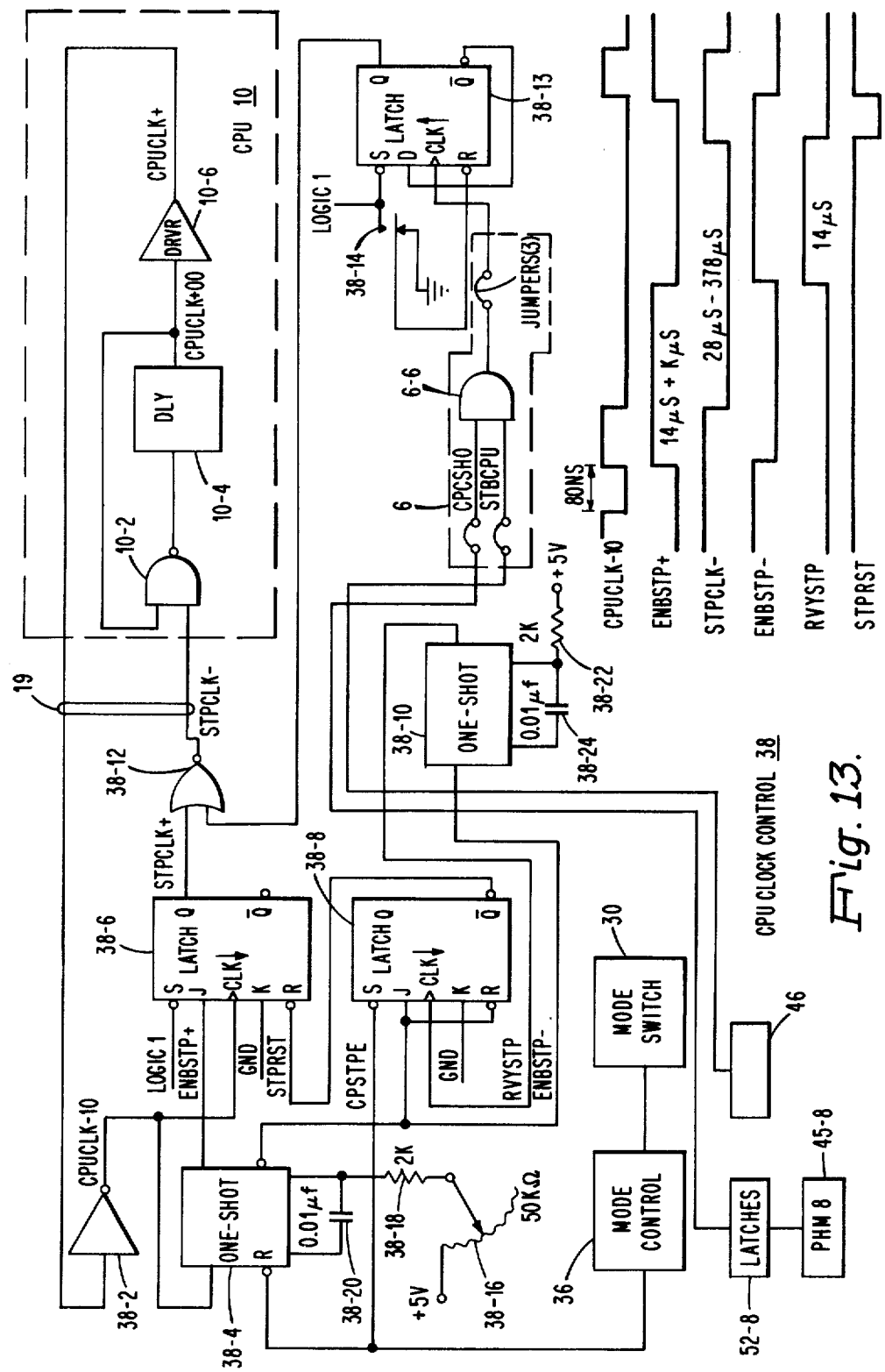
FIG. 13 shows the logic and timing of the signals for slowing down or stopping the CPU clock.

Referring to FIG. 13, the CPU clock control 38 generates the signal STPCLK− which when applied to the CPU 10 stops the CPU clock (signal CPUCLK+ at logical ONE) as long as signal STPCLK− remains at logical ZERO. The time period for the STPCLK− when set by a potentiometer 38-16 may vary between 14 microseconds and 378 microseconds. The STPCLK− signal may remain at logical ZERO for an indefinite period of time under control of a latch 38-13 and a manual switch 38-14, thereby stopping CPU 10 operation by stopping the CPU 10 clock. The CPU 10 clock signal CPUCLK+ is generated typically by a NAND gate 10-2, a delay line 10-4 and a driver 10-6. The CPUCLK+00 signal which is applied to NAND gate 10-2 from delay line 10-4 cycles, resulting in the cycling of the output of driver 10-6 signal CPUCLK+. Signal CPUCLK+ is inverted by an inverter 38-2 to generate signal CPUCLK−10 which is applied to the CPU clock control 38 and the CPU interface synchronization logic 46. Any signal at logical ZERO applied to NAND gate 10-2 including signal STPCLK− will prevent the signal CPUCLK+ from cycling.

The operator may slow down the CPU 10 clock by placing mode switch 30 in position 2 or 3 causing mode control 36 to generate the signal CPSTPE. Mode switch 30 positions 2 and 3 condition the HMIU 4 to be responsive to system bus 2 signals and cache bus 18 signals, respectively. With the mode switch 30 set at position 2, the HMIU 4 will process system bus 2 traffic at the normal rate. There will be no change in timing rate of the megabus interface synchronization 32 clock signals CLKBUS+ and CLKBUS−. The PHM's 0-5 42 will operate at the normal rate. However, the CPU interface synchronization logic 46 will be responsive to a CPUCLK+ signal from CPU 10 to generate the delay as determined by the potentiometer 38-16 setting. The HMIU 4 will generate a CPUCLK+ clock cycle followed by the preset delay followed by another CPUCLK+ cycle. This will enable the monitor to capture all of the CPU 10 instruction execution cycles.

As seen from the timing diagram in FIG. 13, an ENBSTP+ signal is generated for a duration of 14 microseconds and K microseconds by a one-shot multivibrator 38-4 on the rise of the first CPUCLK−10 signal. The value of K is determined by the setting of potentiometer 38-16. A latch 38-6 is set on the fall of CPUCLK−10 since the ENBSTP+ signal applied to latch 38-6 is at logical ONE. This generates a STPCLK+ signal which is inverted by the NOR gate 38-12 to generate a STPCLK− signal which is sent over bus 19 to CPU 10. The STPCLK− signal at logical ZERO applied to NAND gate 10-2 keys the CPUCLK+00 signal at logical ONE. This in turn forces signal CPUCLK+ which is sent to the HMIU 4 via CPU bus 19 to logical ONE and the CPUCLK−10 signal to logical ZERO, thereby preventing signals CLKCPU+ and CLKCPU− of FIG. 11 from cycling. The duration between the rise of successive CPUCLK−10 signals is from 28 microseconds to 378 microseconds.

Signal ENBSTP− which is applied to a one-shot 38-10 goes to logical ONE at the end of the one-shot 38-4 timing cycle forcing signal RVYSTP to logical ONE for approximately 14 microseconds. This allows time for the recovery of the one-shot 38-4. Latch 38-8 sets on the fall of the RVYSTP signal thereby resetting flop 38-6 by signal STPRST. This forces the STPCLK+ signal to logical ZERO which enables the CPU 10 clock. One cycle of the CPU 10 clock signal is generated for each STPCLK+ signal cycle.

One-shots 38-4 and 38-10 are 74221 circuits and latches 38-6 and 38-8 are 74S112 circuits. The 0.01 μf capacitors 38-20 and 38-24 and the 2K ohm resistors 38-18 and 38-22 establish the time constants of the one-shots 38-4 and 38-10. Note that the time constant of the one-shot 38-4 is varied by means of potentiometer 38-16.

It may be desirable to stop the CPU clock on some predetermined system event rather than just slowing the clock; for example, to stop the clock when a predetermined control store address appears on the CPU bus 19. The PHM 8 45-8 sets a selected latch of latches 52-8 to generate the CPCSHO signal. Latch 38-13 is set when the strobe signal STBCPU is generated by the CPU interface logic 46 thereby stopping the CPU clock. The clock is reactivated by the operator grounding the reset terminal of latch 38-13 by the 38-14 switch. The latch 38-13 is a 74S74 circuit.

Having shown and described a preferred embodiment of the invention, those skilled in the art will realize that many variations and modifications may be made to affect the described invention and still be within the scope of the claimed invention. Thus, many of the elements indicated above may be altered or replaced by different elements which will provide the same result and fall within the spirit of the claimed invention. It is the intention, therefore, to limit the invention only as indicated by the scope of the claims.

What is claimed is:

1. A data processing system includes a plurality of subsystems, a main memory, a central processor unit (CPU), a cache and a plurality of I/O controllers, all coupled in common to a system bus, said CPU also being coupled to said cache by a separate bus, a monitor interface unit is coupled to said system bus, said cache by a cache bus and said CPU by a CPU bus for monitoring information transferred over said system bus, information transferred between said CPU and said cache and internal CPU information, a monitor is coupled to said monitor interface unit for receiving hit signals indicative of predetermined information for generating data processing system performance data, apparatus in said monitor interface unit generates a stop clock signal having a fixed predetermined cycle time, said stop clock signal being applied to said CPU via said CPU bus, said CPU having clock control means responsive to states of said stop clock signal for starting and stopping a CPU clock signal resulting in a CPU clock signal cycling at said fixed predetermined cycle time which causes the starting or stopping of the CPU operation, said apparatus comprising:

a mode switch for generating a clock stop enable signal;

first one-shot multivibrator means responsive to said CPU clock signal, said clock stop enable signal and a potentiometer resistance value setting for generating a first and a second stretched pulse signal wherein said first and said second stretched pulse signals are complementary signals;

first latch means responsive to said CPU clock signal and said first stretched pulse signal for setting an output of said first latch means to a first state;

second one-shot multivibrator means responsive to said second stretched pulse signal for generating a delayed stretched pulse signal;

second latch means responsive to said clock stop enable signal, said delayed stretched pulse signal and said second stretched pulse signal for generating a stop reset signal, said first latch means being responsive to said stop reset signal for setting said output to a second state;

third latch means enabled by a reset switch signal and responsive to the generation of a predetermined hit signal for setting an output of said third latch means to a first state; and NOR gate means responsive to said outputs of said first and third latch means for generating said stop clock signal to said CPU.

2. The apparatus of claim 1 wherein said first one-shot multivibrator means comprises:

a first one-shot multivibrator responsive to a rise of said CPU clock signal and said clock stop enable signal for generating said first and said second stretched pulse signals; and a potentiometer coupled to said one-shot multivibrator, said one-shot multivibrator being responsive to said potentiometer resistance value setting for generating a length of pulse of said first and said second stretched pulse signals.

3. The apparatus of claim 2 wherein said first latch means comprises:

a first latch responsive to said first pulse signal in a first state and a fall of said CPU clock signal for setting said output to said first state.

4. The apparatus of claim 3 wherein said second one-shot multivibrator means comprises:
   a second one-shot multivibrator responsive to a rise of said second stretched signal to a first state for generating said delayed stretched signal.

5. The apparatus of claim 4 wherein said second latch means comprises:
   a second latch responsive to said clock stop enable signal, said second stretched pulse signal in said first state and a fall of said delayed stretched signal for generating said stop reset signal.

6. The apparatus of claim 5 wherein said third latch means comprises:

a reset switch in a first state for generating said reset switch signal in a first state and said reset switch in a second state for generating said reset switch signal in a second state;

a programmable hit matrix responsive to predetermined information for generating a plurality of hit signals; and a third latch responsive to said reset switch signal in said first state and said predetermined hit signal for setting said output to said first state, and responsive to said reset switch signal in said second state for resetting said output to a second state.

* * * * *